(12) United States Patent
Noda et al.

(10) Patent No.: US 7,540,980 B2
(45) Date of Patent: Jun. 2, 2009

(54) CONDUCTIVE RESIN COMPOSITION AND MOLDED OBJECT

(75) Inventors: Kazuya Noda, Sodegaura (JP); Hiroshi Nishino, Fujisawa (JP); Norio Sakata, Sodegaura (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 504 days.

(21) Appl. No.: 10/570,272

(22) PCT Filed: Sep. 10, 2004

(86) PCT No.: PCT/JP2004/013230

§ 371 (c)(1),
(2), (4) Date: Mar. 2, 2006

(87) PCT Pub. No.: WO2005/026260

PCT Pub. Date: Mar. 24, 2005

(65) Prior Publication Data

US 2007/0029530 A1 Feb. 8, 2007

(30) Foreign Application Priority Data

Sep. 12, 2003 (JP) ............................. 2003-321436

(51) Int. Cl.
*H01B 1/22* (2006.01)
(52) U.S. Cl. .................. 252/511; 524/495; 280/770
(58) Field of Classification Search ........... 252/510, 252/511; 524/495; 280/770
See application file for complete search history.

(56) References Cited

U.S. PATENT DOCUMENTS 3,379,792 A    4/1968  Finholt
5,741,846 A    4/1998  Fortuijin
5,977,240 A   11/1999  Lohmeijer
6,221,283 B1   4/2001  Dharmarajan
6,352,654 B1   3/2002  Silvi
2003/0116757 A1*  6/2003  Miyoshi et al. ............. 252/511
2003/0134963 A1   7/2003  Miyoshi

FOREIGN PATENT DOCUMENTS

EP    0 506 386    9/1992

(Continued)

*Primary Examiner*—Mark Kopec
(74) *Attorney, Agent, or Firm*—Finnegan, Henderson, Farabow, Garrett & Dunner, L.L.P.

(57) ABSTRACT

A conductive resin composition produced by melt-kneading a mixture comprising a polyamide (A), a polyphenylene ether (B) (non-terminal-modified polyphenylene ether and/or terminal-modified polyphenylene ether), a rubbery polymer (C), a conductive carbonaceous material (D) (carbon black and/or carbon fibril), and a low molecular weight modifier compound (E) (compatibility agent), wherein the mixture has the following characteristics: (1) the amount of (D) is 0.2 to 3% by weight, based on the total weight of (A) to (E), (2) the amount of (E) is more than 0.01% by weight and less than 0.20% by weight, based on the total weight of (A) to (E), and (3) the amount (a) of a volatile substance contained in (B) satisfies the following formula: $0 \leq a \leq -7.3 \times E + 1.83$, wherein E is the % by weight of (E), based on the total weight of (A) to (E), the amount (a) being expressed in terms of a weight decrease (% by weight) of (B) as measured by subjecting (B) to vacuum drying in vacuo at 180 °C. for 1 hour.

20 Claims, 3 Drawing Sheets

FOREIGN PATENT DOCUMENTS

| | | |
|---|---|---|
| JP | 2-201811 | 8/1990 |
| JP | 2001-302904 | 10/2001 |
| JP | 2002-194093 A | 7/2002 |
| JP | 2002-206054 | 7/2002 |
| JP | 2004-143239 A | 5/2004 |
| JP | 2004-143241 | 5/2004 |

* cited by examiner

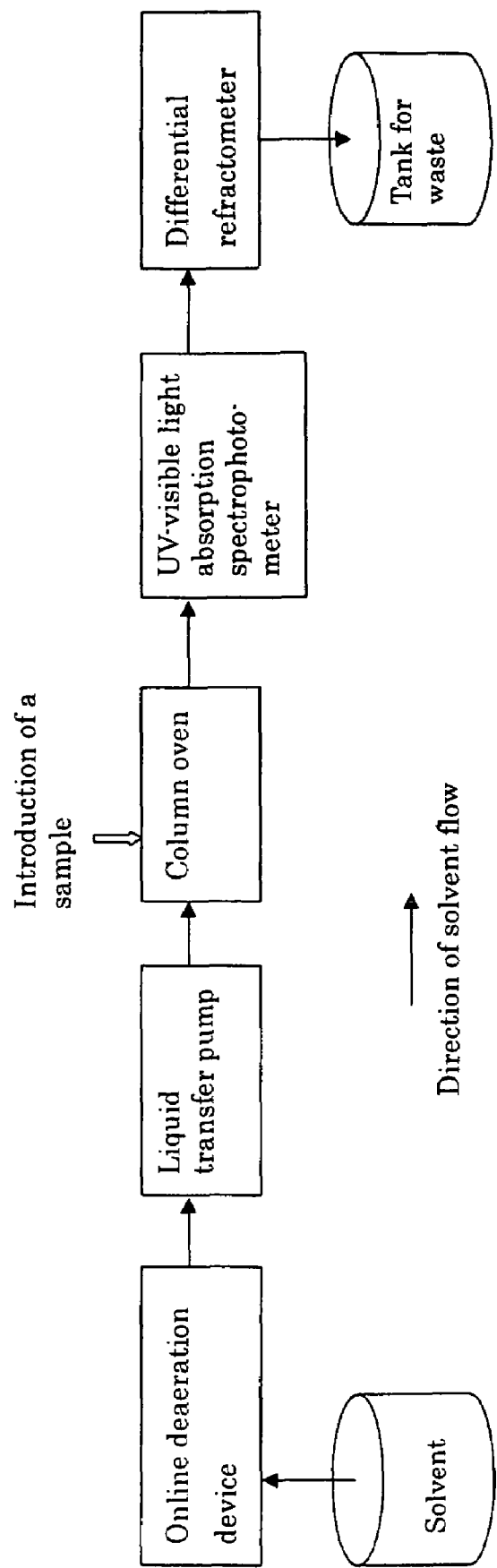

US 7,540,980 B2

CONDUCTIVE RESIN COMPOSITION AND MOLDED OBJECT

CROSS REFERENCE TO RELATED APPLICATIONS

This application is a National Phase Application based on PCT/JP2004/013230, filed Sep. 10, 2004,the content of which is incorporated herein by reference, and claims the priority of Japanese Patent Application No. 2003-321436, filed on Sep. 12, 2003.

BACKGROUND OF THE INVENTION

1. Field of the Invention

The present invention relates to a conductive resin composition. More particularly, the present invention is concerned with a conductive resin composition produced by melt-kneading a mixture comprising a polyamide (A), a polyphenylene ether (B), a rubbery polymer (C), a conductive carbonaceous material (D), and a low molecular weight modifier compound (E) which functions as a compatibility agent for the polyamide (A) and the polyphenylene ether (B), wherein the amounts of the conductive carbonaceous material (D) and the low molecular weight modifier compound (E) which are contained in the mixture are within respective specific ranges, and the amount of a volatile substance contained in the polyphenylene ether (B) is also within a specific range. The conductive resin composition of the present invention not only exhibits excellent impact strength and heat stability, but also is capable of suppressing die build-up (i.e., deposit of a resin at a die outlet of an extruder which increases with the lapse of time during the extrusion) and strand breakage which occur during the extrusion molding thereof. Such a conductive resin composition can be used in a wide variety of fields, such as electric and electronic parts, parts of office automation machines, automobile parts and other mechanical parts. Especially, even when used as a raw material for producing a large shaped article, the resin composition exhibits excellent heat stability during the residence thereof in a molding machine, and the resultant shaped article has not only conductivity sufficient for electrostatic coating but also excellent coating adhesion strength even after exposure of the shaped article to heat. Therefore, the conductive resin composition of the present invention is very advantageous as a raw material for producing a large shaped article, such as an automobile outer panel, which is subjected to an electrostatic coating.

2. Prior Art

Polyphenylene ethers not only have excellent mechanical and electrical properties and excellent heat resistance, but also have excellent dimensional stability. Therefore, polyphenylene ethers have been used in a wide variety of fields. However, the moldability of a polyphenylene ether is poor. For improving the moldability of a polyphenylene ether, Examined Japanese Patent Publication No. Sho 45-997 (corresponding to U.S. Pat. No. 3,379,792) discloses a technique in which a polyamide is added to a polyphenylene ether, to thereby obtain a polyamide-polyphenylene ether alloy. Nowadays, polyamide-polyether alloys are used in a very wide variety of fields.

Recently, as an electrostatically coatable material, use of a conductivity-imparted polyamide-polyphenylene ether alloy is rapidly expanding in the fields of automobile outer panels (such as a fender and a door panel). For example, it has been attempted to use an automobile fender made of a polyamide-polyphenylene ether alloy for the purpose of improving not only the safety of automobiles (e.g., protection of pedestrians) but also the ability of an automobile fender to recover from distortion.

The materials used for an automobile outer panel are required to have various good properties, such as a conductivity sufficient for electrostatic coating, impact resistance, heat resistance and melt-fluidity.

With respect to the method for imparting a conductivity to a polyamide-polyphenylene ether alloy, for example, Unexamined Japanese Patent Application Laid-Open Specification No. Hei 2-201811 discloses a technique to lower the surface resistance of a polyamide-polyphenylene ether alloy by a method in which carbon black is caused to be contained mainly in the polyamide phase of the polyamide-polyphenylene ether alloy, or by a method in which carbon black is uniformly dispersed in a polyamide, followed by mixing thereof with a polyphenylene ether.

Unexamined Japanese Patent Application Laid-Open Specification No. Hei 8-48869 (corresponding to U.S. Pat. No. 5,977,240) discloses a technique in which a polyamide and a polyphenylene ether are compatibilized with each other in advance, followed by addition of carbon black, to thereby obtain a resin composition having good impact strength, good melt-fluidity, and excellent (low) volume resistivity.

Further, Unexamined Japanese Patent Application Laid-Open Specification No. Hei 4-300956 (corresponding to EP 506386) describes that, in the production of a composition containing a polyamide, a polyphenylene ether and carbon black, by adjusting the amounts of these components and using a polyphenylene ether and a polyamide which have specific relative viscosities, it becomes possible to improve the conductivity and processability of the composition.

International Patent Application Publication No. WO 01/81473 discloses a technique in which a conductive carbonaceous filler (Ketjen Black) is caused to be present in a particulate form in the polyphenylene ether phase of a polyamide-polyphenylene ether resin composition. Further, Japanese Patent Application prior-to-examination Publication (Tokuhyo) No. 2002-544308 (corresponding to U.S. Pat. No. 6,221,283) discloses a method for producing a resin composition containing a dispersed phase polymer, a continuous phase polymer, a conductivity imparting agent and a compatibility agent in which the amount of the compatibility agent is adjusted to control the particle size of the dispersed phase polymer in the continuous phase polymer, to thereby achieve a desired volume resistivity of the resin composition. In addition, Unexamined Japanese Patent Application Laid-Open Specification No. 2001-302904 discloses a technique in which a modified polyphenylene ether obtained by modifying a solid polyphenylene ether is melt-kneaded with a polyamide and an inorganic filler (such as carbon black), to thereby obtain a resin composition having excellent appearance, impact resistance and heat resistance.

However, due to the addition of a conductive filler, each of the above-mentioned techniques poses a problem in that, when the production of a resin composition is performed using a large extruder for a long time, die build-up (i.e., deposit of a resin at a die outlet of an extruder which increases with the lapse of time during the extrusion) is likely to occur. Further, when the obtained resin composition is shaped into a large article (such as an automobile outer panel), disadvantages are caused in that the heat stability during the residence of the resin composition in a molding machine is lowered, the molding conditions are restricted, and the productivity of shaped articles is markedly lowered.

In the fields where a shaped article needs to be subjected to an electrostatic coating, it is important that the shaped article has excellent appearance so as to ensure a satisfactory level of coating adhesion strength and sharpness of an image reflected on the coated shaped article. In the field of automobile fenders, sometimes after an online electrostatic coating of a shaped article, the coated shaped article is subjected to a heat treatment together with a metal panel so as to cure a rust resisting paint coated on the metal panel. Such a heat treatment is generally performed at about 170° C. to 200° C. or at a higher temperature for 10 to 50 minutes. Therefore, the resin composition used in the field of automobile fenders is required to have, in particular, excellent coating adhesion strength not only just after the molding process but also after heat exposure, as well as excellent heat resistance and heat stiffness.

However, conventionally, it has been impossible to produce a resin composition having properties required of a raw material used for producing an automobile fender, i.e., a resin composition which not only has excellent balance of impact resistance, stiffness and conductivity, but also is improved with respect to the heat stability during the residence in a molding machine and the coating adhesion strength after heat exposure. Therefore, the development of a new technique to produce such a resin composition has been desired in the art.

DISCLOSURE OF THE INVENTION

Problems to be Solved by the Invention

The object of the present invention is to provide a conductive resin composition which is capable of suppressing die build-up (i.e., deposit of a resin at a die outlet of an extruder which increases with the lapse of time during the extrusion) and strand breakage during the extrusion molding thereof, and which is advantageous in that, even when used as a raw material for producing a large shaped article, the resin composition exhibits excellent heat stability during the residence thereof in a molding machine and the resultant shaped article has not only conductivity sufficient for electrostatic coating but also excellent coating adhesion strength even after exposure of the shaped article to heat.

Another object of the present invention is to provide a shaped article (such as an automobile outer panel) formed from the above-mentioned conductive resin composition.

Means to Solve the Problems

SUMMARY OF THE INVENTION

In this situation, the present inventors have made extensive and intensive studies with a view toward solving the above-mentioned problems. As a result, they have unexpectedly found that the above-mentioned problems can be solved by a conductive resin composition which is produced by melt-kneading a mixture comprising a polyamide (A), a polyphenylene ether (B), a rubbery polymer (C), a conductive carbonaceous material (D), and a low molecular weight modifier compound (E) which functions as a compatibility agent for the polyamide (A) and the polyphenylene ether (B), wherein the amounts of the conductive carbonaceous material (D) and the low molecular weight modifier compound (E) which are contained in the mixture are within respective specific ranges, and the amount of a volatile substance contained in the polyphenylene ether (B) is also within a specific range. The present invention has been completed, based on this finding.

The forgoing and other objects, features and advantages of the present invention will be apparent to those skilled in the art from the following detailed description taken in connection with the accompanying drawings and the appended claims.

Effects of the Invention

DETAILED DESCRIPTION OF THE INVENTION

According to the present invention, there is provided a conductive resin composition produced by melt-kneading a mixture comprising:
a polyamide (A),
at least one polyphenylene ether (B) selected from the group consisting of a non-terminal-modified polyphenylene ether and a terminal-modified polyphenylene ether, wherein the terminal-modified polyphenylene ether is obtained by melt-kneading a non-terminal-modified polyphenylene ether with a first low molecular weight modifier compound (b) which functions as a compatibility agent for the polyamide (A) and the polyphenylene ether (B),
a rubbery polymer (C),
at least one conductive carbonaceous material (D) selected from the group consisting of a conductive carbon black and a conductive carbon fibril, and
a second low molecular weight modifier compound (E) which functions as a compatibility agent for the polyamide (A) and the polyphenylene ether (B),
wherein the first low molecular weight modifier compound (b) and the second low molecular weight modifier compound (E) are the same or different,
wherein the mixture has the following characteristics:
(1) the amount of the at least one conductive carbonaceous material (D) is in the range of from 0.2 to 3% by weight, based on the total weight of the components (A) to (E),
(2) the amount of the second low molecular weight modifier compound (E) is in the range of from more than 0.01% by weight to less than 0.20% by weight, based on the total weight of the components (A) to (E), and
(3) the amount (a) of a volatile substance contained in the at least one polyphenylene ether (B) satisfies the following formula:

$$0 \leq a \leq -7.3 \times E + 1.83,$$

wherein E represents the % by weight of the component (E), based on the total weight of the components (A) to (E),
the amount (a) being expressed in terms of a weight decrease (% by weight) of the at least one polyphenylene ether (B) as measured by subjecting the at least one polyphenylene ether (B) to vacuum drying under a vacuum of $1.3 \times 10^2$ to $6.7 \times 10^3$ Pa at 180° C. for 1 hour, wherein the weight decrease is calculated by the following formula:

weight decrease (% by weight) ={(weight of polyphenylene ether (B) prior to vacuum drying−weight of polyphenylene ether (B) after vacuum drying)/ weight of polyphenylene ether (B) prior to vacuum drying}×100.

For an easier understanding of the present invention, the essential features and various preferred embodiments of the present invention are enumerated below.

1. A conductive resin composition produced by melt-kneading a mixture comprising:
a polyamide (A),
at least one polyphenylene ether (B) selected from the group consisting of a non-terminal-modified polyphenylene ether and a terminal-modified polyphenylene ether, wherein the terminal-modified polyphenylene ether is obtained by melt-kneading a non-terminal-modified polyphenylene ether with a first low molecular weight modifier compound (b) which functions as a compatibility agent for the polyamide (A) and the polyphenylene ether (B), a rubbery polymer (C), at least one conductive carbonaceous material (D) selected from the group consisting of a conductive carbon black and a conductive carbon fibril, and a second low molecular weight modifier compound (E) which functions as a compatibility agent for the polyamide (A) and the polyphenylene ether (B), wherein the first low molecular weight modifier compound (b) and the second low molecular weight modifier compound (E) are the same or different, wherein the mixture has the following characteristics:

(1) the amount of the at least one conductive carbonaceous material (D) is in the range of from 0.2 to 3% by weight, based on the total weight of the components (A) to (E), (2) the amount of the second low molecular weight modifier compound (E) is in the range of from more than 0.01% by weight to less than 0.20% by weight, based on the total weight of the components (A) to (E), and (3) the amount (a) of a volatile substance contained in the at least one polyphenylene ether (B) satisfies the following formula:

$$0 \leq a \leq -7.3 \times E + 1.83,$$

wherein E represents the % by weight of the component (E), based on the total weight of the components (A) to (E), the amount (a) being expressed in terms of a weight decrease (% by weight) of the at least one polyphenylene ether (B) as measured by subjecting the at least one polyphenylene ether (B) to vacuum drying under a vacuum of $1.3 \times 10^2$ to $6.7 \times 10^3$ Pa at 180° C. for 1 hour, wherein the weight decrease is calculated by the following formula:

weight decrease (% by weight) = { (weight of polyphenylene ether (B) prior to vacuum drying − weight of polyphenylene ether (B) after vacuum drying)/weight of polyphenylene ether (B) prior to vacuum drying}×100.

2. The resin composition according to item 1 above, wherein the amount of the second low molecular weight modifier compound (E) in the mixture is in the range of from 0.02 to 0.18% by weight, based on the total weight of the components (A) to (E).

3. The resin composition according to item 1 above, wherein the amount of the second low molecular weight modifier compound (E) in the mixture is in the range of from 0.02 to 0.15% by weight, based on the total weight of the components (A) to (E).

4. The resin composition according to any one of items 1 to 3, wherein the amount of the at least one carbonaceous material (D) in the mixture is in the range of from 0.5 to 2.5% by weight, based on the total weight of the components (A) to (E).

5. The resin composition according to any one of items 1 to 4 above, wherein the amount (a) of the volatile substance is 1.0% by weight or less.

6. The resin composition according to any one of items 1 to 5 above, wherein the component (D) is a conductive carbon black.

7. The resin composition according to any one of items 1 to 6 above, wherein the conductive carbon black as component (D) exhibits a dibutyl phthalate (DBP) oil absorption value of at least 250 ml per 100 g of the carbon black.

8. The resin composition according to any one of items 1 to 7 above, wherein each of the first low molecular weight modifier compound (b) and the second low molecular weight modifier compound (E) is independently at least one compound selected from the group consisting of maleic anhydride, fumaric acid, maleic acid, itaconic acid, itaconic anhydride, citraconic acid, citraconic anhydride, aconitic acid, aconitic anhydride, citric acid and malic acid.

9. The resin composition according to any one of items 1 to 8 above, wherein the rubbery polymer (C) is a mixture of at least one relatively low molecular weight block copolymer (C-1) having a number average molecular weight of 120,000 or less and at least one relatively high molecular weight block copolymer (C-2) having a number average molecular weight of 200,000 or more, each of the block copolymers (C-1) and (C-2) independently comprising at least one vinyl aromatic hydrocarbon polymer block comprised mainly of vinyl aromatic hydrocarbon monomer units, and at least one conjugated diene polymer block comprised mainly of conjugated diene monomer units.

10. The resin composition according to item 9 above, wherein the at least one relatively low molecular weight block copolymer (C-1) comprises:

10 to 100 parts by weight of a block copolymer (C-1a) having a content of the at least one vinyl aromatic hydrocarbon polymer block within the range of from 55 to 90% by weight, based on the weight of the block copolymer (C-1a), and 0 to 90 parts by weight of a block copolymer (C-1b) having a content of the at least one vinyl aromatic hydrocarbon polymer block of less than 55% by weight, based on the weight of the block copolymer (C-1b), wherein the total of the block copolymers (C-1a) and (C-1b) is 100 parts by weight.

11. The resin composition according to any one of items 1 to 10 above, wherein the weight average molecular weight of the at least one polyphenylene ether (B) in the resin composition is 50,000 or more, and the molecular weight distribution of the at least one polyphenylene ether (B) in the resin composition is 3.2 or less in terms of the Mw/Mn ratio, wherein Mw represents the weight average molecular weight of the component (B) and Mn represents the number average molecular weight of the component (B).

12. The resin composition according to item 11 above, wherein the weight average molecular weight of the at least one polyphenylene ether (B) in the resin composition is in the range of from 55,000 to 70,000, and the molecular weight distribution of the at least one polyphenylene ether (B) in the resin composition is 3.0 or less in terms of the Mw/Mn ratio.

13. The resin composition according to any one of items 1 to 12 above, wherein the melt-kneading of a mixture of the components (A) to (E) is performed by a method comprising:

(1) melt-kneading together at least a part of the polyamide (A) and the at least one conductive carbonaceous material (D) to thereby obtain a masterbatch, and (2) melt-kneading the obtained masterbatch with the components (B), (C) and (E), and the remaining part, if any, of the polyamide (A).

14. The resin composition according to item 13 above, wherein the masterbatch comprises a conductive carbon black as the component (D), wherein at least a part of the conductive carbon black is present in the form of 1 to 100 agglomerated particles each independently having a major axis of 20 to 100 μm, as observed under an optical microscope with respect to a contiguous area of 3 mm².

15. The resin composition according to any one of items 1 to 14 above, wherein the mixture further comprises at least one inorganic filler in an amount of 5 to 25 parts by weight, relative to 100 parts by weight of the total of the components (A) to (E).

16. The resin composition of any one of items 1 to 15 above, which is a shaped article.

17. The resin composition of item 16 above, which contains at least one low molecular weight component which is detected in size exclusion chromatography at an elution time within the range of from 22 to 23.5 minutes, the size exclusion chromatography being performed using tetrahydrofuran as an eluent with respect to a chloroform-soluble component present in the surface portion of the shaped article which is after being heated at 204° C. for 40 minutes, and wherein the amount of the at least one low molecular weight component is 0.15 or less in terms of a ratio of the height of a peak or the total heights of peaks which is or are observed at an elution time within the range of from 22 to 23.5 minutes, relative to the height of a peak or the total height of peaks which is or are observed at an elution time within the range of from 14 to 15 minutes, each peak observed in the size exclusion chromatography.

18. The resin composition according to item 17 above, wherein the amount of the at least one low molecular weight component is up to 0.10.

19. The resin composition according to any one of items 16 to 18 above, which is an online-coated automobile fender.

The conductive resin composition of the present invention is a resin composition produced by melt-kneading a mixture comprising a polyamide (A), at least one polyphenylene ether (B) selected from the group consisting of a non-terminal-modified polyphenylene ether and a terminal-modified polyphenylene ether, a rubbery polymer (C), at least one conductive carbonaceous material (D) selected from the group consisting of a conductive carbon black and a conductive carbon fibril, and a low molecular weight modifier compound (E) which functions as a compatibility agent for the polyamide (A) and the polyphenylene ether (B).

Hereinbelow, the components used in the conductive resin composition of the present invention are explained in detail.

With respect to the type of a polyamide which can be used as the polyamide (A) in the conductive resin composition of the present invention, there is no particular limitation so long as it is a polymer having amide {—NH—C(═O)—} linkages in the recurring units thereof.

In general, a polyamide is obtained by, for example, a ring opening polymerization of a lactam, a condensation polymerization of a diamine and a dicarboxylic acid, or a condensation polymerization of an aminocarboxylic acid. However, in the present invention, the method for obtaining a polyamide is not limited to these examples.

Examples of diamines mentioned above include aliphatic diamines, alicyclic diamines and aromatic diamines. Specifically, there can be mentioned tetramethylenediamine, hexamethylenediamine, undecamethylenediamine, dodecamethylenediamine, tridecamethylenediamine, 2,2,4-trimethylhexamethylenediamine, 2,4,4-trimethylhexamethylenediamine, 5-methylnonamethylenediamine, 1,3-bisaminomethylcyclohexane, 1,4-bisaminomethylcyclohexane, m-phenylenediamine, p-phenylenediamine, m-xylylenediamine and p-xylylenediamine.

Examples of dicarboxylic acids include aliphatic dicarboxylic acids, alicyclic dicarboxylic acids and aromatic dicarboxylic acids. Specifically, there can be mentioned adipic acid, suberic acid, azelaic acid, sebacic acid, dodecanoic diacid, 1,1,3-tridecanoic diacid, 1,3-cyclohexane dicarboxylic acid, terephthalic acid, isophthalic acid, naphthalene dicarboxylic acid and a dimer acid.

Specific examples of lactams include ε-caprolactam, enanthlactam and ω-laurolactam.

Further, specific examples of aminocarboxylic acids include ε-aminocaproic acid, 7-aminoheptanoic acid, 8-aminooctanoic acid, 9-aminononanoic acid, 11-aminoundecanoic acid, 12-aminododecanoic acid and 13-aminotridecanoic acid.

In the present invention, the polyamide may either be a homopolymer obtained from any of the above-mentioned compounds (i.e., lactams, diamines, dicarboxylic acids and ω-aminocarboxylic acids), or a copolymer obtained by subjecting a mixture of at least two types of the above-mentioned compounds to a condensation polymerization.

In the present invention, it is also preferred to use a polyamide obtained by a method in which one or more of the above-mentioned compounds (i.e., lactams, diamines, dicarboxylic acids and ω-aminocarboxylic acids) are polymerized in a polymerization reactor to thereby obtain a low molecular weight oligomer, and the obtained oligomer is subjected to further polymerization in an extruder or the like, to thereby obtain a high molecular weight polymer.

Examples of polyamides which can be advantageously used in the present invention include polyamide 6, polyamide 6,6, polyamide 4,6, polyamide 11, polyamide 12, polyamide 6,10, polyamide 6,12, polyamide 6/6,6, polyamide 6/6,12, polyamide MXD (m-xylylenediamine)/6, polyamide 6,T, polyamide 6,I, polyamide 6/6,T, polyamide 6/6,I, polyamide 6,6/6,T, polyamide 6,6/6,I, polyamide 6/6,T/6,I, polyamide 6,6/6,T/6,I, polyamide 6/12/6,T, polyamide 6,6/12/6,T, polyamide 6/12/6,I and polyamide 6,6/12/6,I. Further, it is also possible to use a polyamide product obtained by copolymerizing a plurality of different polyamides using an extruder or the like.

Preferred examples of polyamides include polyamide 6, polyamide 6,6, a polyamide 6/6,6, a polyamide 6/6,I, and a mixture thereof.

The number average molecular weight of the polyamide used in the present invention is preferably 5,000 to 100,000, more preferably 10,000 to 30,000.

The polyamide used in the present invention is not limited to those which are exemplified above, and may be a mixture of a plurality of polyamides having different molecular weights. For example, the polyamide may be a mixture of a low molecular weight polyamide having a number average molecular weight of less than 15,000 and a high molecular weight polyamide having a number average molecular weight of 15,000 or more.

The terminal groups of the polyamide participate in a reaction with a polyphenylene ether. A polyamide generally has an amino group and a carboxyl group as terminal groups thereof. In general, when the carboxyl group concentration of a polyamide resin is increased, the impact resistance of such a polyamide becomes lowered whereas the melt-fluidity of the polyamide becomes improved. On the other hand, when the amino group concentration of a polyamide resin is increased, the impact resistance of such a polyamide becomes improved whereas the melt-fluidity of the polyamide becomes lowered.

In the present invention, the concentration ratio of the amino group to the carboxyl group (amino group/carboxyl group ratio) is preferably 9/1 to 1/9, more preferably 8/2 to 1/9, most preferably 6/4 to 1/9.

The concentration of the terminal amino group in the polyamide is preferably at least 10 milliequivalents, more preferably at least 30 milliequivalents, per kg of the polyamide.

Any conventional methods can be used to control the amounts of the terminal groups of the polyamides. For example, there can be mentioned a method in which a diamine, a dicarboxylic acid or a monocarboxylic acid is added to the reaction system of a polymerization for producing a polyamide so as to obtain a polyamide having a desired terminal amino group concentration, and a method in which two or more different polyamides having different terminal group ratios are mixed together.

Further, for improving the heat stability of a polyamide, a metal compound stabilizer as described in Unexamined Japanese Patent Application Laid-Open Specification No. Hei 1-163262 may be used.

Among the conventional metal compound stabilizers, especially preferred are CuI, $CuCl_2$, copper acetate and cerium stearate. Also preferred are halogen salts of alkali metals, such as potassium iodide and potassium bromide. These metal compound stabilizers can be used individually or in combination.

It is preferred that the metal compound stabilizer is added to the polyamide in an amount of 0.001 to 1 part by weight, relative to 100 parts by weight of the polyamide.

Further, any of other conventional additives for a polyamide can be also added to the polyamide. Such additive(s) can be used in an amount of less than 10 parts by weight, relative to 100 parts by weight of the polyamide.

Examples of the polyphenylene ethers (B) which can be used in the present invention include a homopolymer and a copolymer, each independently comprising a structural unit represented by the following formula (1):

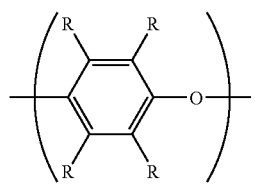

(1)

wherein O represents an oxygen atom, and each R independently represents a hydrogen atom, a halogen atom, a primary or secondary $C_1$-$C_7$ alkyl group, a phenyl group, a $C_1$-$C_7$ haloalkyl group, a $C_1$-$C_7$ aminoalkyl group, a $C_1$-$C_7$ hydrocarbyloxy group or a $C_1$-$C_7$ halohydrocarbyloxy group (in which at least two carbon atoms are present between the halogen atom and the oxygen atom).

Specific examples of polyphenylene ethers which can be used in the present invention include poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether). Further examples of polyphenylene ethers include a copolymer of 2,6-dimethylphenol and another phenol (for example, a copolymer of 2,6-dimethylphenol with 2,3,6-trimethylphenol and a copolymer of 2,6-dimethylphenol with 2-methyl-6-butylphenol, which are described in Examined Japanese Patent Application Publication No. Sho 52-17880).

Among the above-mentioned polyphenylene ethers, preferred are poly(2,6-dimethyl-1,4-phenylene ether), a copolymer of 2,6-dimethylphenol with 2,3,6-trimethylphenol, and a mixture thereof.

With respect to the method for producing the polyphenylene ether (B) used in the present invention, there is no particular limitation, and any conventional methods can be used. For example, there can be mentioned methods as described in U.S. Pat. Nos. 3,306,874, 3,306,875, 3,257,357 and 3,257,358, and Unexamined Japanese Patent Application Laid-Open Specification Nos. Sho 50-51197 and Sho 63-152628.

With respect to the polyphenylene ether (B) which can be used in the present invention, the reduced viscosity ($\eta_{sp/c}$) thereof is preferably in the range of from 0.15 to 0.70 dl/g, more preferably from 0.20 to 0.60 dl/g, still more preferably from 0.40 to 0.55 dl/g, as measured at 30° C. with respect to a 0.5 g/dl chloroform solution of the polyphenylene ether. When the reduced viscosity of the polyphenylene ether is higher than 0.70 dl/g, the melt fluidity of the polyphenylene ether tends to become low. On the other hand, when the reduced viscosity of the polyphenylene ether is lower than 0.15 dl/g, the mechanical properties of the polyphenylene ether tend to become poor.

In the present invention, a mixture of two or more different types of polyphenylene ethers having different reduced viscosities can be used as the polyphenylene ether (B) without causing any problem. As examples of such a mixture, there can be mentioned a mixture of a polyphenylene ether having a reduced viscosity of 0.45 dl/g or less and a polyphenylene ether having a reduced viscosity of 0.50 dl/g or more, and a mixture of a polyphenylene ether having a reduced viscosity of 0.40 dl/g or less and a polyphenylene ether having a reduced viscosity of 0.50 dl/g or more, but the polyphenylene ether mixtures are not limited to those which are exemplified above.

The polyphenylene ether (B) used in the present invention may be in a terminal-modified form or may be in the form of a mixture of a non-terminal-modified polyphenylene ether and a terminal-modified polyphenylene ether.

From the viewpoint of improvement of the melt stability of the polyphenylene ether (B) during the residence thereof in a molding machine, it is preferred to use a mixture of a non-terminal-unmodified polyphenylene ether and a terminal-modified polyphenylene ether. With respect to such a mixture, from the viewpoint of improvement of both the melt fluidity of the polyphenylene ether (B) and the melt stability of the polyphenylene ether (B) during the residence thereof in a molding machine, it is especially preferred that the amount of the non-terminal-modified polyphenylene ether is larger that that of the terminal-modified polyphenylene ether. Specifically, it is preferred that the amount of the non-terminal-modified polyphenylene ether is 55% by weight or more, based on the weight of the above-mentioned mixture. Further, it is preferred that the reduced viscosity of the non-terminal-modified polyphenylene ether (as measured at 30° C. with respect to a 0.5 g/dl chloroform solution of the polyphenylene ether) is higher than that of the terminal-modified polyphenylene ether.

In the present invention, the "terminal-modified polyphenylene ether" means a polyphenylene ether which is modified with at least one first low molecular weight modifier compound (b) having (i) at least one unsaturated bond selected from the group consisting of a carbon-carbon double bond and a carbon-carbon triple bond and (ii) at least one functional group selected from the group consisting of a carboxylic acid group, an acid anhydride group, an amino group, a hydroxyl group and a glycidyl group. In the composition of the present invention, the first low molecular weight modifier compound (b) functions as a compatibility agent for the polyamide (A) and the polyphenylene ether (B).

More specific explanation is made below with respect to the low molecular weight modifier compound (b).

As examples of the modifier compound which has a carbon-carbon double bond, and has a carboxylic acid group and/or an acid anhydride group, there can be mentioned maleic acid, fumaric acid, chloromaleic acid, cis-4-cyclohexene-1,2-dicarboxylic acid and acid anhydrides thereof. Among the above-mentioned compounds, fumaric acid, maleic acid and maleic anhydride are preferred, and fumaric acid and maleic anhydride are more preferred.

Further, it is also possible to use a compound which is obtained by esterifying one or two carboxyl groups of any of the above-mentioned unsaturated dicarboxylic acids.

As examples of low molecular weight modifier compounds having a carbon-carbon double bond and a glycidyl group, there can be mentioned allylglycidyl ether, glycidyl acrylate, glycidyl methacrylate and epoxidized natural oils and fats.

Among the above-mentioned compounds, glycidyl acrylate and glycidyl methacrylate are especially preferred.

As examples of low molecular weight modifier compounds having a carbon-carbon double bond and a hydroxyl group, there can be mentioned unsaturated alcohols represented by the following formula: $C_nH_{2n-3}OH$ (wherein n is a positive integer), such as an allyl alcohol, 4-pentene-1-ol and 1,4-pentadiene-3-ol; and unsaturated alcohols represented by the following formulae: $C_nH_{2n-5}OH$ and $C_nH_{2n-7}OH$ (wherein n is a positive integer).

The above-mentioned modifier compounds may be used individually or in combination.

The terminal modification of the polyphenylene ether by the above-mentioned first low molecular weight modifier compound (b) can be performed by a method in which a non-terminal-modified polyphenylene ether and a low molecular weight modifier compound (b) are melt-kneaded in either the presence or absence of a radical initiator at a temperature which is equal to or higher than the glass transition temperature of the non-terminal-modified polyphenylene ether and not higher than 360° C. During the melt-kneading, it is preferred to perform a vacuum evacuation through an evacuation vent provided at a downstream portion of an extruder such that the amount of an unreacted first low molecular weight modifier compound (b) is suppressed to less than 0.01% by weight, based on the weight of the resultant terminal-modified polyphenylene ether. It is especially preferred that the vacuum evacuation is performed under conditions wherein the degree of vacuum is $2.1 \times 10^4$ Pa or less. Alternatively, the amount of an unreacted first low molecular weight modifier compound (b) may be reduced to less than 0.01% by weight by a method in which terminal-modified polyphenylene ether pellets obtained by the melt-kneading is dried by heating under reduced pressure or washed with a solvent.

The amount of the first low molecular weight modifier compound (b) used for the terminal modification of the polyphenylene ether is preferably 0.1 to 3 parts by weight, more preferably 0.3 to 2 parts by weight, relative to 100 parts by weight of the non-terminal-modified polyphenylene ether.

As the above-mentioned radical initiator, any of conventional organic peroxides and diazo group-containing compounds can be used. Specific examples of radical initiators include benzoyl peroxide, dicumyl peroxide, di-tert-butyl peroxide, tert-butylcumyl peroxide, tert-butyl hydroperoxide, cumene hydroperoxide and azobisisobutyronitrile.

When a terminal-modified polyphenylene ether is produced using a radical initiator, the radical initiator is preferably used in amount of 0.001 to 1 part by weight, relative to 100 parts by weight of the polyphenylene ether.

It is preferred that the amount of the modifier compound incorporated into the modified polyphenylene ether is 0.01 to 5% by weight, more preferably 0.1 to 3% by weight, based on the weight of the terminal-modified polyphenylene ether.

The modified polyphenylene ether may contain an unreacted modifier compound. For reducing the amount of the unreacted modifier compound in the terminal-modified polyphenylene ether, if desired, a compound having an amide linkage and/or an amino group may be added during the production of the terminal-modified polyphenylene ether.

In the present invention, the "compound having an amide linkage" means a compound having a structure represented by the formula: —NH—C(=O)—, and the "compound having an amino group" means a compound having at least one terminal —$NH_2$ group. Specific examples of compounds having an amide linkage and/or an amino group include aliphatic amines, such as octyl amine, nonyl amine, tetramethylene diamine and hexamethylene diamine; aromatic amines, such as aniline, m-phenylenediamine, p-phenylenediamine, m-xylylenediamine and p-xylylenediamine; products obtained by reacting any of the above-mentioned amines with a carboxylic acid or a dicarboxylic acid; lactams, such as ε-caprolactam; and polyamide resins, but the compounds having an amide linkage and/or an amino group are not limited to the compounds exemplified above.

When the compound having an amide bond and/or an amino group is used, it is preferred that the amount of the compound is 0.001 part by weight or more and less than 5 parts by weight, more preferably 0.01 part by weight or more and less than 1 part by weight, still more preferably 0.01 part by weight or more and less than 0.1 part by weight, relative to 100 parts by weight of the polyphenylene ether prior to the terminal modification.

Further, in the present invention, it is necessary that the amount (a) of a volatile substance contained in the above-mentioned at least one polyphenylene ether (B) satisfy the following formula:

$$0 \leq a \leq -7.3 \times E + 1.83,$$

wherein E represents the % by weight of component (E), based on the total weight of components (A) to (E).

The amount (a) is expressed in terms of a weight decrease (% by weight) of the above-mentioned at least one polyphenylene ether (B) as measured by subjecting the polyphenylene ether (B) to vacuum drying under a vacuum of $1.3 \times 10^2$ to $6.7 \times 10^3$ Pa at 180° C. for 1 hour, wherein the weight decrease is calculated by the following formula:

weight decrease (% by weight) ={(weight of polyphenylene ether (B) prior to vacuum drying–weight of polyphenylene ether (B) after vacuum drying)/ weight of polyphenylene ether (B) prior to vacuum drying}×100.

The vacuum drying can be performed by, for example, a vacuum cold thermostat (tradename: "CVK-23PS", manufactured by Isuzu Seisakusho Co., Ltd., Japan).

Further, it is preferred that the amount (a) of a volatile substance not only satisfies the above-mentioned formula, but also is 1.0% by weight or less, more advantageously 0.6% by weight or less, still more advantageously 0.2% by weight or less, based on the weight of the polyphenylene ether (B).

The amount (a) of a volatile substance contained in the above-mentioned at least one polyphenylene ether (B) can be controlled by adjusting the temperature and time for the drying performed after the polymerization reaction for producing the polyphenylene ether (B). As a specific example of a method for controlling the amount (a) of a volatile substance, there can be mentioned a method in which 2,6-xylenol is subjected to an oxidative coupling polymerization in the presence of dibutylamine by the method described in Unexamined Japanese Patent Application Laid-Open Specification Nos. 2002-3596 or Sho. 64-33131, or the like, followed by drying, to thereby obtain a polyphenylene ether in the form of a white powder, and the obtained polyphenylene ether is dried by a hot air dryer having a temperature of 120° C., wherein the time for drying is appropriately selected so as to reduce the amount (a) of a volatile substance to a desired level. However, the method for controlling the amount (a) of a volatile substance is not limited to that exemplified above, and any methods can be used as long as the amount (a) of a volatile substance contained in the polyphenylene ether can be reduced to the above-mentioned amount.

The above-mentioned volatile substance encompasses a polymerization solvent, a residual monomer, a residual oligomer and the like. Examples of polymerization solvents include organic solvents, such as toluene, isomers of xylene, ethylbenzene, $C_1$-$C_5$ alcohols, chloroform, dichloromethane, chlorobenzene, and dichlorobenzene. The polymerization solvent may be in the form of a mixture of two or more of the solvents exemplified above.

Further, in the present invention, it is preferred that the weight average molecular weight (Mw) of the polyphenylene ether (B) in the conductive resin composition is 50,000 or more, and the molecular weight distribution of the polyphenylene ether (B) in the conductive resin composition is 3.2 or less in terms of the Mw/Mn ratio, wherein Mw represents the weight average molecular weight of the component (B) and Mn represents the number average molecular weight of the component (B). It is more preferred that polyphenylene ether (B) has an Mw of 55,000 and an Mw/Mn of 3.0 or less, and it is especially preferred that polyphenylene ether (B) has an Mw of 55,000 to 70,000, and an Mw/Mn of 3.0 or less.

The above-mentioned Mw of the polyphenylene ether (B) present in the conductive resin composition can be easily measured by the following method. The conductive resin composition in an amount sufficient for the measurement was finely pulverized, followed by extraction with chloroform using a Soxhlet's extractor. The resultant chloroform solution is analyzed by a gel permeation chromatography (GPC) apparatus and an ultraviolet spectrometric detector. From the resultant data, the molecular weight data is obtained using a calibration curve obtained with respect to standard polystyrene samples. The obtained molecular weight data is processed by a commercially available GPC processing software (e.g., "480 data station", produced and sold by System Instruments (SIC) Co., Ltd., Japan), so as to determine the amounts of molecules having molecular weights within a specific range. In the measurement, it is important to select an appropriate UV wavelength so as not to detect other polymers, such as a block copolymer used as component (C), which are eluted concomitantly with the polyphenylene ether during the GPC analysis. (For example, the measurement can be performed under the following conditions.

GPC apparatus: GPC SYSTEM 21, manufactured and sold by Showa Denko Co., Japan;
Detector: UV-41, manufactured and sold by Showa Denko Co., Japan;
Solvent: chloroform;
Temperature: 40° C.;
Columns: columns for the sample (K-G, K-800RL and K-800R) and columns for the reference (K-805L, 2 columns);
Flow rate: 10 ml/min;
Wavelength used for detection: 283 nm; and
Pressure: 15 to 17 kg/cm$^2$.)

Next, an explanation is made with respect to the component (D) used in the present invention. The component (D) is at least one conductive carbonaceous material selected from the group consisting of a conductive carbon black and a conductive carbon fibril.

With respect to the conductive carbon black usable in the present invention, more specific explanation is made below. It is preferred that the carbon black used in the present invention exhibits a dibutyl phthalate (DBP) oil absorption value of at least 250 ml, more advantageously at least 350 ml, still more advantageously 400 ml, per 100 g of the carbon black. In the present invention, the DBP oil absorption is a value obtained in accordance with ASTM D2414. When the DBP oil absorption value is outside the above-mentioned range, the conductivity of the resin composition tends to become low.

Further, it is preferred that the conductive carbon black used in the present invention is a carbon black having a BET surface area of at least 200 cm$^2$, more advantageously at least 400 cm$^2$, per gram of the carbon black. When the BET surface area of the carbon black is outside the above-mentioned range, the conductivity of the resin composition tends to become low. Examples of such conductive carbon blacks which are commercially available include Ketjen black EC and a Ketjen black EC-600JD, both manufactured by Ketjen Black International Co., Japan.

As the above-mentioned carbon fibril, there can be mentioned a carbon fibril having a hollow structure, a small amount of branches and an average fiber diameter of less than 75 nm, such as those described in U.S. Pat. Nos. 4,663,230, 5,165,909, 5,171,560, 5,578,543, 5,589,152, 5,650,370, and 6,235,674. Further, the carbon fibril may be in the form of a coil having a coil pitch of 1 μm or less. As an example of commercially available carbon fibrils, there can be mentioned Hyperion (manufactured and sold by Hyperion Catalysis International, U.S.A.).

In the present invention, the amount of the conductive carbonaceous material (D) (a carbon black and/or a carbon fibril) is in the range of from 0.2 to 3% by weight, based on the total weight of the components (A) to (E). For achieving excellent balance of the impact resistance, melt fluidity and conductivity of the resin composition, it is preferred that the amount of the carbonaceous material (D) is in the range of from 0.5 to 2.5% by weight, more advantageously 0.7 to 2% by weight.

In the production of the conductive resin composition of the present invention, it is preferred that a carbon black and/or a carbon fibril, which is used as a raw material, is in the form of a masterbatch obtained by melt-kneading a polyamide and a carbon black and/or a carbon fibril. The mastarbatch may be in the form of pellets, a powder or granules.

The amount of the carbonaceous material (D) contained in the masterbatch is preferably from 5 to 25% by weight, more preferably from 6 to 10% by weight, based on the weight of the masterbatch.

Especially, it is preferred that the above-mentioned masterbatch is a conductive masterbatch described in U.S. Patent Application Publication No. 2004/0082729. Specifically, for example, it is preferred to use a conductive masterbatch in which a conductive carbon black is present in the form of at least one agglomerated particle having a major axis of 20 to 100 μm, wherein the number of the agglomerated particle(s)

is 1 to 100 as observed under an optical microscope with respect to a contiguous area of 3 mm².

As a preferred method for producing the masterbatch, there can be mentioned a method in which the raw materials for the masterbatch are melt-kneaded by a twin-screw extruder or a kneader. Especially preferred is a method in which the polyamide (A) is melted, followed by addition of the conductive carbonaceous material (D). Specific examples of such methods include the following methods which use a twin-screw extruder or kneader having at least one first inlet and at least one second inlet which are, respectively, provided at an upstream portion(s) and a downstream portion(s) of the extruder or kneader:

a method in which the polyamide (A) is fed from the first inlet of the extruder or kneader to thereby melt the polyamide (A), and the conductive carbonaceous material (D) is added to the molten polyamide (A) in the extruder or kneader from the second inlet thereof, followed by melt-kneading of the resultant mixture; and a method in which the polyamide (A) is fed from the first inlet of the extruder or kneader to thereby melt the polyamide (A), and the conductive carbonaceous material (D) and an additional amount of the polyamide (A) are simultaneously added to the molten polyamide (A) in the extruder or kneader from the second inlet thereof, followed by melt-kneading of the resultant mixture.

The production of the conductive resin composition of the present invention using the above-mentioned masterbatch can be performed by melt-kneading a mixture of the components (A) to (E) by a method comprising:

(1) melt-kneading together at least a part of the polyamide (A) and the at least one conductive carbonaceous material (D) to thereby obtain a masterbatch, and (2) melt-kneading the obtained masterbatch with the components (B), (C) and (E), and the remaining part, if any, of the polyamide (A). With respect to the melt-kneading temperature for producing the masterbatch, there is no particular limitation. For example, an appropriate temperature is selected within the range of from 250 to 350° C.

The conductive resin composition of the present invention may contain a styrene-containing thermoplastic resin in an amount of less than 50 parts by weight, relative to 100 parts by weight of the total of the polyamide (A) and the polyphenylene ether (B). As examples of styrene-containing thermoplastic resins used in the present invention, there can be mentioned a polystyrene (homopolymer) and a styrene-acrylonitrile copolymer (AS resin).

Further, any of conventional additives which can be used for a polyphenylene ether can be added to the conductive resin composition in an amount of less than 10 parts by weight, relative to 100 parts by weight of the polyphenylene ether (B). Examples of conventional additives include metal compound stabilizers, such as zinc oxide and zinc sulfide; and organic stabilizers, such as a hindered phenol type stabilizer, a phosphorous type stabilizer and a hindered amine type stabilizer.

As rubbery polymer (C) used in the conductive resin composition of the present invention, for example, it is possible to use at least one polymer selected from the group consisting of a vinyl aromatic hydrocarbon/conjugated diene block copolymer comprising at least one vinyl aromatic hydrocarbon polymer block comprised mainly of vinyl aromatic hydrocarbon monomer units and at least one conjugated diene polymer block comprised mainly of conjugated diene monomer units and a hydrogenation product thereof; an ethylene-α-olefin copolymer, a rubber-modified polystyrene (HIPS) and a styrene-rubber polymer-acrylonitrile copolymer (ABS resin).

Specific examples of vinyl aromatic hydrocarbons used for producing the vinyl aromatic hydrocarbon/conjugated diene block copolymer used in the present invention include styrene, α-methyl styrene and vinyl toluene. These compounds can be used individually or in combination. Among the above-exemplified compounds, styrene is especially preferred.

Specific examples of conjugated dienes used for producing the vinyl aromatic hydrocarbon-conjugated diene block copolymer used in the present invention include butadiene, isoprene, piperylene and 1,3-pentadiene. These compounds can be used individually or in combination. Among the above-exemplified compounds, preferred are butadiene, isoprene and a mixture thereof.

Specific examples of rubbery polymers include block copolymers, such as SBS (styrene-butadiene block copolymer), SEBS (styrene-ethylene/butylene block copolymer), SEP (styrene-ethylene/propylene block copolymer) and SEPS (styrene-ethylene/propylene-styrene block copolymer).

With respect to the microstructure of a soft segment (composed of the conjugated diene monomer units) of the above-mentioned block copolymer, it is preferred that the 1,2-vinyl bond content or the total content of the 1,2-vinyl bond and the 3,4-vinyl bond is 5 to 80%, more preferably 10 to 50%, most preferably 10 to 40%.

It is preferred that the above-mentioned block copolymer has a block configuration selected from the group consisting of A-B, A-B-A and A-B-A-B, wherein A represents a vinyl aromatic hydrocarbon polymer block and B represents a conjugated diene polymer block. The block copolymer used in the present invention can be a mixture of block copolymers having different block configurations.

Among the above-mentioned block configurations, A-B-A and A-B-A-B are preferred. The block copolymer can be a mixture of different block copolymers having the above-mentioned block configurations.

Further, it is preferred that the vinyl aromatic hydrocarbon-conjugated diene block copolymer used in the conductive resin composition of the present invention is a hydrogenated block copolymer. The "hydrogenated block copolymer" herein means a copolymer which is obtained by hydrogenating any of the above-mentioned vinyl aromatic hydrocarbon-conjugated diene block copolymers wherein the degree of hydrogenation of the aliphatic double bonds in the conjugated diene polymer block is more than 0% and up to 100%. The degree of hydrogenation of the hydrogenated block copolymer is preferably 50% or more, more preferably 80% or more, most preferably 98% or more.

In the present invention, a mixture of an unhydrogenated block copolymer and a hydrogenated block copolymer can be used without causing any problem.

With respect to the block copolymer used as rubbery polymer (C) in the conductive resin composition of the present invention, it is preferred that the block copolymer is a mixture of a relatively low molecular weight block copolymer and a relatively high molecular weight block copolymer. Specifically, it is preferred to use a mixture of at least one relatively low molecular weight block copolymer (C-1) having a number average molecular weight of less than 150,000, preferably 120,000 or less, and at least one relatively high molecular weight block copolymer (C-2) having a number average molecular weight of 150,000 or more, preferably 200,000 or more.

In the present invention, the number average molecular weight is measured by a gel permeation chromatography (GPC) apparatus (for example, GPC SYSTEM 21, manufactured and sold by Showa Denko Co., Japan), using an ultraviolet spectrometric detector (for example, UV-41, manufactured and sold by Showa Denko Co., Japan) and a calibration curve obtained with respect to standard polystyrene samples. The conditions employed for measuring the number average molecular weight are as follows.

(Conditions)
Solvent: chloroform,
Temperature: 40° C.,
Columns: columns for the sample (K-G, K-800RL and K-800R) and columns for the reference (K-805L, 2 columns),
Flow rate: 10 ml/min,
Wavelength used for detection: 254 nm, and
Pressure: 15 to 17 kg/cm$^2$.

In the measurement of the number average molecular weight, a low molecular weight component by-produced due to the deactivation of a polymerization catalyst may be detected, but such a low molecular weight component is ignored in the calculation of the molecular weight. In general, a correctly calculated molecular weight distribution (weight average molecular weight (Mw)/number average molecular weight (Mn) ratio) is in the range of from 1.0 to 1.2.

The weight ratio of the relatively low molecular weight block copolymer (C-1) to the relatively high molecular weight block copolymer (C-2) ((C-1)/(C-2) weight ratio) in the mixture of the relatively low molecular weight block copolymer (C-1) and the relatively high molecular weight block copolymer (C-2) is generally in the range of from 95/5 to 5/95, preferably 90/10 to 10/90.

Further, in the present invention, when the relatively low molecular weight block copolymer (C-1) used in the above-mentioned mixture comprises a vinyl aromatic hydrocarbon polymer block having a number average molecular weight of 20,000 or more, it becomes possible to improve the heat resistance of the conductive resin composition as well as the impact resistance.

The number average molecular weight of a vinyl aromatic hydrocarbon polymer block of a block copolymer can be calculated from the number average molecular weight of the block copolymer mentioned above in accordance with the following formula:

$$Mn(\alpha)=\{Mn \times \alpha/(\alpha+\beta)\}/N$$

wherein Mn($\alpha$) represents the number average molecular weight of the vinyl aromatic hydrocarbon polymer block; Mn represents the number average molecular weight of the block copolymer; "$\alpha$" represents the % by weight of the total of the vinyl aromatic hydrocarbon polymer blocks, based on the weight of the block copolymer; "$\beta$" represents the % by weight of the total of the conjugated diene polymer blocks, based on the weight of the block copolymer; and N represents the number of the vinyl aromatic hydrocarbon polymer blocks in the block copolymer.

Further, in the present invention, it is preferred that a block copolymer used as the at least one relatively low molecular weight block copolymer (C-1) comprises:

10 to 100 parts by weight of a block copolymer (C-1a) having a content of the at least one vinyl aromatic hydrocarbon polymer block within the range of from 55 to 90% by weight, based on the weight of the block copolymer (C-1a), and 0 to 90 parts by weight of a block copolymer (C-1b) having a content of the at least one vinyl aromatic hydrocarbon polymer block of less than 55% by weight, based on the weight of the block copolymer (C-1b), wherein the total of the block copolymers (C-1a) and (C-1b) is 100 parts by weight.

The use of the above-mentioned block copolymer (C-1a) is advantageous for improving the heat resistance of the conductive resin composition.

Further, in the present invention, when the relatively low molecular weight block copolymer (C-1) is a mixture of the above-mentioned block copolymer (C-1a) and block copolymer (C-1b) having a content of the at least one vinyl aromatic hydrocarbon polymer block of 20% by weight or more and less than 55% by weight, it becomes possible to improve the melt-fluidity of the conductive resin composition. In this case, the weight ratio of the block copolymer (C-1a) to the block copolymer (C-1b) [(C-1a)/(C-1b) weight ratio] in the mixture of the block copolymers (C-1a) and (C-1b) is preferably in the range of from 10/0 to 2/8, more preferably 10/0 to 4/6.

Before the rubbery polymer (C) is mixed with other components of the conductive resin composition of the present invention, the rubbery polymer (C) may be mixed with an oil composed mainly of a paraffin. The addition of an oil composed mainly of paraffin to the rubbery polymer leads to an improvement in the processability of the resin composition. The content of the oil composed mainly of a paraffin in the rubbery polymer (C) is preferably not more than 50% by weight, more preferably not more than 30% by weight.

The above-mentioned vinyl aromatic hydrocarbon/conjugated diene block copolymer may be a mixture of different block copolymers. For example, the block copolymer may be a mixture of block copolymers having different block configurations, a mixture of block copolymers containing different vinyl aromatic hydrocarbon monomer units, a mixture of block copolymers containing different conjugated diene monomer units, a mixture of block copolymers having different 1,2-vinyl contents or different total contents of 1,2-vinyl bond and 3,4-vinyl bond, a mixture of block copolymers having different vinyl aromatic monomer unit contents, and a mixture of block copolymers having different degrees of hydrogenation.

As a specific example of ethylene-$\alpha$-olefin copolymers which can be used in the present invention, there can be mentioned one which is described in Unexamined Japanese Patent Application Laid-Open Specification No. 2001-302911.

Further, the rubbery polymer (C) used in the conductive resin composition of the present invention may be a modified rubbery polymer or a mixture of a modified rubbery polymer and an unmodified rubbery polymer.

The modified rubbery polymer mentioned herein means a rubbery polymer which is modified with at least one third low molecular weight modifier compound (c) having (i) at least one unsaturated bond selected from the group consisting of a carbon-carbon double bond and a carbon-carbon triple bond and having (ii) at least one functional group selected from the group consisting of a carboxylic acid group, an acid anhydride group, an amino group, a hydroxyl group and a glycidyl group. With respect to the third low molecular weight modifier compound (c), any of the compounds exemplified above as the first low molecular weight modifier compound (b) can be used.

With respect to the mixture of the components (A) to (E) which is obtained during the production of the conductive resin composition of the present invention, it is preferred that the mixture contains 30 to 70 parts by weight of the polyamide (A), 20 to 50 parts by weight of the polyphenylene ether (B) and 5 to 30 parts by weight of the rubbery polymer (C), relative to 100 parts by weight of the total of the polyamide (A), the polyphenylene ether (B) and the rubbery polymer (C). It is more preferred that the mixture contains 40 to 60 parts by weight of the polyamide (A), 30 to 40 parts by weight of the polyphenylene ether (B) and 5 to 15 parts by weight of the rubbery polymer (C), relative to 100 parts by weight of the total of the polyamide (A), the polyphenylene ether (B) and the rubbery polymer (C).

The second low molecular weight modifier compound (E) which functions as a compatibility agent for the polyamide (A) and the polyphenylene ether (B) and which can be used in the present invention is a multifunctional compound which interacts with one or both of the polyamide (A) and the polyphenylene ether (B). In the conductive resin composition of the present invention, the compatibility of the polyamide (A) with the polyphenylene ether (B) is improved by using the second low molecular weight modifier compound (E).

As examples of the second low molecular weight modifier compound (E) which functions as a compatibility agent, there can be mentioned at least one low molecular weight modifier compound having (i) at least one unsaturated bond selected from the group consisting of a carbon-carbon double bond and a carbon-carbon triple bond and having (ii) at least one functional group selected from the group consisting of a carboxylic acid group, an acid anhydride group, an amino group, a hydroxyl group and a glycidyl group.

As preferred examples of second low molecular weight modifier compounds (E) which function as a compatibility agent, there can be mentioned maleic anhydride, fumaric acid, maleic acid, itaconic acid, itaconic anhydride, citraconic acid, citraconic anhydride, aconitic acid, aconitic anhydride, citric acid and malic acid. Among the above-exemplified compounds, maleic acid, maleic anhydride and citric acid are advantageous as a compatibility agent. These compounds can be used individually or in combination. The first low molecular weight modifier compound (b) and the second low molecular weight modifier compound (E) may be the same or different. When a modified rubbery polymer is used as rubbery polymer (C), the third low molecular weight modifier compound (c) and the first low molecular weight modifier compound (b) and/or the second low molecular weight modifier compound (E) may be the same or different.

When a terminal-modified polyphenylene ether is used as polyphenylene ether (B), an unreacted low molecular weight modifier compound contained in the terminal-modified polyphenylene ether is regarded as component (E). Further, when the rubbery polymer (C) is a modified rubbery polymer which has been modified by using, as third low molecular weight modifier compound (c), a low molecular weight modifier compound which also functions as a compatibility agent for the polyamide (A) and the polyphenylene ether (B), an unreacted third low molecular weight modifier compound (c), if any, which is contained in the modified rubbery polymer, is also regarded as component (E).

The amount of the modifier compound (E) (compatibility agent) used in the present invention is more than 0.01% by weight and less than 0.20% by weight, preferably from 0.02 to 0.18% by weight, more preferably from 0.02 to 0.15% by weight, most preferably from 0.03 to 0.10% by weight, based on the total weight of the components (A) to (E). When the amount of the modifier compound (E) (compatibility agent) is 0.20% by weight or more, the heat stability of the resin composition during residence thereof in a molding machine becomes low, and the coating adhesion strength of a shaped article produced therefrom also becomes low after exposure of the shaped article to heat. On the other hand, when the amount of the modifier compound (E) (compatibility agent) is 0.01% by weight or less, the impact strength and coating adhesion strength (after molding and after exposure to heat) of the resin composition become low.

Conventionally, during the production of a polyamide/polyphenylene ether/carbon black composition, a relatively large amount (e.g., 0.2% by weight or more) of a modifier is added to the composition, taking into consideration the balance between the impact strength and conductivity of the composition. Contrary to the above, the present inventors have found that, by using the modifier in an amount which is smaller than used in the conventional techniques and reducing the amount of a volatile substance contained in the polyphenylene ether to fall within a specific range, it becomes possible to improve not only the impact strength and conductivity of a polyamide/polyphenylene ether/carbon black composition, but also the heat stability during residence of the resin composition in a molding machine and coating adhesion strength after exposure of an ultimate shaped article to heat.

In the present invention, in addition to the above-mentioned components of the conductive resin composition, if desired, an additional component(s) can be added to the conductive resin composition as long as the additional component(s) does not adversely affect the excellent properties of the resin composition of the present invention.

The additional components used in the present invention are explained below. Examples of additional components include thermoplastic resins, such as a polyester and a polyolefin; inorganic fillers (such as talc, kaolin, xonotlite, wollastonite, titanium oxide, potassium titanate and a glass fiber); conventional adhesion modifiers which enhance the affinity between an inorganic filler and a resin; flame retardants (such as a halogenated resin, a silicone flame retardant, magnesium hydroxide, aluminum hydroxide, an organic phosphoric ester compound, ammonium polyphosphate and red phosphorus), fluororesins having an effect to prevent the dripping of flaming particles; plasticizers (such as an oil, a low molecular weight polyolefin, a polyethylene glycol and a fatty ester); auxiliary flame retardants, such as antimony trioxide; carbon black as a pigment; a carbon fiber; antistatic agents; various peroxides; zinc oxide; zinc sulfide; antioxidants; ultraviolet absorbers; and light stabilizers.

In the present invention, the amount of the additional component(s) added to the resin composition is not more than 50 parts by weight, relative to 100 parts by weight of the total weight of the components (A) to (E).

In the present invention, the addition of wollastonite as an inorganic filler is especially preferred. Wollastonite is a material obtained by purifying, pulverizing and classifying a natural mineral composed of calcium silicate. Alternatively, a synthetic wollastonite may be used. In general, large wollastonite particles (having an average fiber diameter of 40 µm and a maximum fiber length of 600 µm) are used as a substitute for glass fibers. However, in the present invention, use is made of wollastonite particles having an average particle diameter of from 2 to 9 µm and an aspect ratio of 5 or more, preferably an average particle diameter of from 3 to 7 µm and an aspect ratio of 5 or more. As wollastonite particles, it is more preferred to use a mixture of two or more types of wollastonite particles having different aspect ratios. Specifically, there can be used a mixture of wollastonite particles having an aspect ratio of 5 or more and wollastonite particles having an aspect ratio of less than 5.

In the present invention, if desired, the wollastonite particles may be treated with a surface treatment agent. Examples of surface treatment agents include higher fatty acids and derivatives (e.g., esters and salts) thereof (such as stearic acid, oleic acid, palmitic acid, magnesium stearate, calcium stearate, alminum stearate, stearic acid amide and ethyl stearate) and coupling agents (such as a silane coupling agent, a titanate coupling agent, an aluminum coupling agent and a zirconium coupling agent). The surface treatment agent is used in an amount of from 0.05% by weight to 5% by weight, based on the weight of the wollastonite particles.

Further, it is also preferred to add talc (as an inorganic filler) to the resin composition of the present invention. Talc is used for improving the appearance of an ultimate shaped article and lowering a heat expansion coefficient of the resin composition. It is preferred that the talc used in the present invention is magnesium silicate particles having an average particle diameter of about 2.0 to 5.0 μm, more advantageously about 3.0 to 5.0 μm.

The inorganic filler used in the present invention may be a mixture of two or more different inorganic fillers, such as talc, kaolin, wollastonite, titanium oxide, potassium titanate and a glass fiber.

The amount of the inorganic filler added to the resin composition is preferably 5 to 40 parts by weight, more preferably 5 to 25 parts by weight, relative to 100 parts by weight of the total weight of the components (A) to (E).

As specific examples of processing apparatuses which can be used to prepare the conductive resin composition of the present invention by melt-kneading the above-mentioned components, there can be mentioned a single-screw extruder, a twin-screw extruder, a roll, a kneader, a Brabender Plastograph and a Banbury mixer. Among these apparatuses, preferred is a twin-screw extruder, and especially preferred is a twin-screw extruder provided with a first inlet and at least one second inlet which are, respectively, formed at an upstream portion and a downstream portion of the extruder.

With respect to the melt-kneading temperature for producing the resin composition, there is no particular limitation. In general, an appropriate temperature for obtaining a desired resin composition is selected within the range of from 240 to 360° C.

As a preferred method for producing the conductive resin composition of the present invention, there can be mentioned a method in which a mixture of the polyphenylene ether (B), the rubbery polymer (C) and the second low molecular weight modifier compound (E) which functions as a compatibility agent is melted, followed by addition of the above-mentioned masterbatch containing the polyamide (A) and the conductive carbonaceous material (D). Specific examples of such methods include the following method which uses a twin-screw extruder having a first inlet and a second inlet which are, respectively, provided at an upstream portion and a downstream portion of the extruder: a method in which the polyphenylene ether (B), the rubbery polymer (C) and the second low molecular weight modifier compound (E) which functions as a compatibility agent are fed from the first inlet of the extruder to thereby melt-knead the components (B), (C) and (E), and the polyamide (A) and the conductive carbonaceous material (D) (or the above-mentioned masterbatch) are added to a molten mixture of the components (B), (C) and (E) in the extruder from the second inlet thereof, followed by melt-kneading of the resultant mixture. Further, during the melt-kneading, it is preferred that the extruder is vacuum deaerated from a deaeration vent provided at a downstream portion of the extruder.

The thus produced conductive resin composition of the present invention is subjected to molding by a desired conventional method, thereby obtaining a shaped resin article.

The shaped resin article mentioned herein includes not only injection-molded articles, but also extrusion-molded articles, such as sheets, films and pellets, and secondary injection molded articles.

The resin composition of the present invention generally contains at least one low molecular weight component which is detected in size exclusion chromatography at an elution time within the range of from 22 to 23.5 minutes, the size exclusion chromatography being performed using tetrahydrofuran as an eluent with respect to a chloroform-soluble component present in the surface portion of the shaped article which is after being heated at 204° C. for 40 minutes. In the present invention, it is preferred that the amount of the above-mentioned at least one low molecular weight component is 0.15 or less, preferably 0.10 or less, in terms of a ratio of the height of a peak or the total heights of peaks which is or are observed at an elution time within the range of from 22 to 23.5 minutes, relative to the height of a peak or the total height of peaks which is or are observed at an elution time within the range of from 14 to 15 minutes, each peak observed in the size exclusion chromatography. When the amount of the at least one low molecular weight component is 0.15 or less, the shaped resin article of the present invention has excellent coating adhesion strength even after exposure thereof to heat.

The "surface portion of a shaped article" herein means a portion of the shaped article which is dissolved out from the shaped article when the shaped article is immersed in chloroform at room temperature for 1 hour.

With respect to the determination of the above-mentioned ratio of the height of a peak (or the total of heights of peaks) observed at an elution time within the range of from 22 to 23.5 minutes in the size exclusion chromatography (using a differential refractometer) which is performed with respect to a chloroform-soluble component, the determination can be performed by the following method.

After heating a shaped resin article at 204° C. for 40 minutes, a specimen (width: 8 cm, length: 8 cm and thickness: no limitation) is cut out from the heated shaped resin article. The shaped resin article specimen is immersed in 50 ml of chloroform (special grade) (manufactured and sold by Wako Pure Chemical Industries, Ltd., Japan) in a 12.5 cm φ Petri dish or the like at room temperature for 1 hour. The immersed shaped resin article specimen is taken out from chloroform and 40 ml of the resultant chloroform containing a resin extract is sampled and evaporated to dryness, thereby obtaining a dried resin extract. The evaporation to dryness can be performed by evaporating chloroform at room temperature for 24 hours.

To the resultant dried resin extract is added 2 ml of tetrahydrofuran (HPLC grade) (manufactured and sold by Wako Pure Chemical Industries, Ltd., Japan), thereby obtaining a sample solution for the analysis by the size exclusion chromatography. The size exclusion chromatography is performed using the following apparatus which employs a differential refractometer.

[Size Exclusion Chromatography Apparatus]
    Online deaeration device (DE): ERC-3322, manufactured and sold by ERC Inc., Japan;
    Liquid transfer pump (PO): DP-8020, manufactured and sold by TOSOH Corporation, Japan;
    Column oven (CO): CO-8010, manufactured and sold by TOSOH Corporation, Japan;
    UV-visible light absorption spectrophotometer (UV): UV-8010, manufactured and sold by TOSOH Corporation, Japan; and
    Differential refractometer (RI): RI-8012, manufactured and sold by TOSOH Corporation, Japan.

The above-mentioned devices are connected as shown in FIG. 1. Tetrahydrofuran (HPLC grade) (manufactured and sold by Wako Pure Chemical Industries, Ltd., Japan) is used as a solvent. The size exclusion chromatography is performed under conditions wherein the flow rate is 1 ml/min, the oven temperature is 40° C. and the wavelength used for UV detection is 254 nm. The following size exclusion chromatography columns are provided in the column oven:

Guard column: TSKguardcolumn $H_{XL}$-L, manufactured and sold by TOSOH Corporation, Japan;

Columns 1 and 2: TSKgel $G1000H_{XL}$, manufactured and sold by TOSOH Corporation, Japan; and Column 3: TSKgel $G2000H_{XL}$, manufactured and sold by TOSOH Corporation, Japan.

The guard column, column 1, column 2 and column 3 are connected in series in this order, and the solvent is flowed in the direction of from the guard column to column 3.

In the determination of the above-mentioned peak height ratio by the size exclusion chromatography, Irganox 1076 (manufactured and sold by Ciba Specialty Chemicals, Switzerland) is used as a standard sample. When the standard sample is analyzed by the size exclusion chromatography (which employs a differential refractometer), the standard sample is detected at an elution time of 17.8 minutes. When the elution time of Irganox 1076 (standard sample) varies, the value obtained by subtracting 17.8 minutes from the elution time of the standard sample [i.e., (Elution time (min) of Irganox 1076)-17.8 (min)] is added to the elution time (min) of the sample solution, to thereby calibrate the elution time of the sample solution.

When the conductive resin composition of the present invention is a shaped resin article containing a conductive carbon black, it is preferred that a part of the conductive carbon black is present in the form of secondary agglomerated particles having an area of 8 $\mu m^2$ or more, wherein the proportion of such secondary agglomerated particles present in the shaped resin article is least 20% by weight, based on the total weight of the conductive carbon black contained in the shaped resin article, as observed with a magnification of 100 under a reflection optical microscope with respect to the surface portions of the shaped resin article, which surface portions have a total area of 10 $mm^2$. It is preferred that the proportion of the secondary agglomerated particles is at least 50% by weight, still more advantageously in the range of from 50 to 80% by weight, based on the total weight of the conductive carbon black contained in the shaped resin article.

In the present invention, the size and proportion of the secondary agglomerated particle(s) of the conductive carbon black are determined by a method which is explained below. A smooth surface portion of a resin composition specimen (shaped resin article) is observed with a magnification of 100 under a reflection optical microscope (for example, "PME3" manufactured and sold by Olympus Optical Co. Ltd., Japan) to examine the dispersed state of the carbon black, and a photomicrograph of the smooth surface portion is taken. The thus obtained photomicrograph is converted into a digital image by a scanner (for example, "CC-600PX" manufactured and sold by Seiko Epson Corporation, Japan), wherein the scanning resolution is 400 dpi. The area fraction of black phases (i.e., the secondary agglomerated particles of carbon black) found in the field of view of the digital image is analyzed automatically by an image processing software ("Image-Pro PLUS Ver. 4.0J" manufactured and sold by MEDIA CYBERNETICS INC., U.S.A.). The analysis of the digital image is performed by employing a method and conditions which are explained below.

(1) Filtering: Median filter (used for removal of impulse noise) (intensity: 3×3 pixels, repetition: 2 times)

(2) Filtering: Equalization filter (object width: 20 pixels, background: bright)

(3) Conditions for determining the area fraction: The area fraction is determined with respect to the black phases having (i) an area of 8 $\mu m^2$ or more (which corresponds to an average diameter of more than 3 $\mu m$ because the area of a circle having a diameter of 3 $\mu m$ is 7.06 $\mu m^2$) and (ii) an aspect ratio of 2 or less (the aspect ratio is a ratio of a major axis to a minor axis of the black phase, wherein the major and minor axes are obtained by measuring the diameters of each black phase at 2° intervals around the center of the black phase) [this aspect ratio is chosen for distinguishing concave scratches (formed during the preparation of the microscope specimen) from a secondary agglomerated particle having a long and narrow shape which is similar to those of the concave scratches]. Further, using a 256-level brightness histogram obtained from the above-mentioned digital image, phases classified as having a brightness which is darker than the light grey phase (i.e., a polyamide-polyphenylene ether phase) in the digital image are chosen and analyzed as images of the secondary agglomerated particles. A large black phase having an aspect ratio of more than 2 is excluded from the above-mentioned automatic analysis. However, when it is evident from the visual observation of the digital image that such a large black phase is a secondary agglomerated particle, the circumference of the large black phase is traced by hand to obtain necessary data and the obtained data is added to the automatic analysis data. On the other hand, when the filters were incapable of removing small concave scratches formed during the preparation of the microscope specimen, such scratches are manually removed from the automatic analysis data.

The area fraction of the secondary agglomerated particles, namely the black phases observed in the field of view of the above-mentioned digital image, is calculated by the above-mentioned method with respect to ten separate photomicrographs of the surface portions of the shaped resin article (total area of the surface portions analyzed is 10 $mm^2$), and an average of the obtained ten area fraction values is calculated. In general, the volume fraction of the secondary agglomerated particles in a resin composition is equal to the area fraction determined with respect to a cross-section of the resin composition and, therefore, the above-obtained average area fraction value is regarded as the volume fraction value of the secondary agglomerated particles in the shaped resin article. Next, the volume fraction value is converted into a weight fraction value by using "1.9" as the true specific gravity of carbon black and "1.1" as the specific gravity of the resin, thereby obtaining a weight fraction of the secondary agglomerated particles having an area of 8 $\mu m^2$ or more. The thus obtained weight fraction value of the secondary agglomerated particles is divided by the total weight fraction of carbon black contained in the shaped resin article (wherein the total weight fraction is determined from the amount of carbon black used as a raw material), to thereby calculate the proportion of the secondary agglomerated particles having an area of 8 $\mu m^2$ or more which are present in the shaped resin article, wherein the proportion of the secondary agglomerated particles is based on the total weight of carbon black contained in the shaped resin article.

The shaped articles of the present invention can be used as various parts of machines. Examples of various shaped articles include parts for electric or electronic appliances, such as an IC tray, a chassis and cabinet of various disc players; parts for office automation machines, such as various computers and peripheral equipment therefor; and mechanical parts; parts for motorcycles, such as a cowl; exterior parts for automobiles, such as a fender, a door panel, a front panel, a rear panel, a locker panel, a rear bumper panel, a back door garnish, an emblem garnish, a panel for a feeding port of a fuel, an over fender, an outer door handle, a door mirror housing, a bonnet air intake, a bumper, a bumper guard, a roof rail, a roof rail leg, a pillar, a pillar cover, a wheel cover, various aero parts (such as a spoiler), various moles and emblems for an automobile; and interior parts for automobiles, such as an instrument panel, a console box and a trim.

Among the above-exemplified molded articles, the conductive resin composition of the present invention is suitable for producing an automobile outer panel, especially a fender of an automobile, which is subjected to an electrostatic coating.

BRIEF DESCRIPTION OF THE DRAWINGS

In the drawings:

FIG. 1 is a schematic view showing the connection between the apparatuses used for the size exclusion chromatography performed in the Working Examples and Comparative Working Examples;

FIG. 2 (b) is an explanatory view showing the relationship between the amount of a volatile substance contained in the polyphenylene ether and the amount of the compatibility agent (i.e., second low molecular weight modifier compound), the relationship being found in the Examples and Comparative Examples employing the conductive carbonaceous material (D) in an amount of 2.5% by weight.

BEST MODE FOR CARRYING OUT THE INVENTION

Figure 2A:
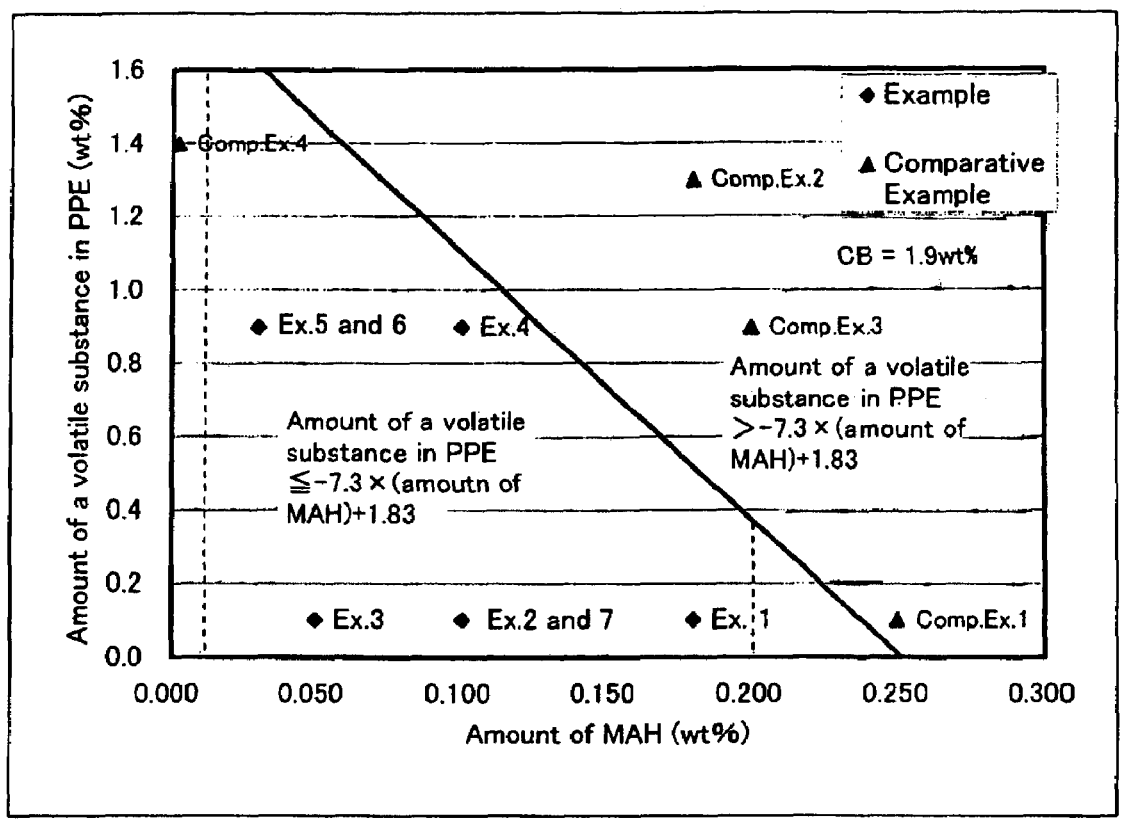
FIG. 2 (a) is an explanatory view showing the relationship between the amount of a volatile substance contained in the polyphenylene ether and the amount of the compatibility agent (i.e., second low molecular weight modifier compound), the relationship being found in the Examples and Comparative Examples employing the conductive carbonaceous material (D) in an amount of 1.9% by weight.

Hereinbelow, the present invention will be described in more detail with reference to the following Examples and Comparative Examples, which should not be construed as limiting the scope of the present invention.

(Raw Materials Used)

In the Examples and Comparative Examples, the following raw materials were used.

(1) Polyamide (A): polyamide 6,6 (hereinafter abbreviated to "PA66")

Number average molecular weight =14,000

Concentration of terminal amino groups=30 miliequivalent/kg

Concentration of terminal carboxyl groups=100 miliequivalent/kg

Cu concentration =30 ppm (added in the form of copper iodide)

(2) Polyphenylene Ether (B): poly(2,6-dimethyl-1,4-phenylene Ether)

(2-1) polyphenylene Ether (Hereinafter Abbreviated to "PPE-1")

In accordance with Unexamined Japanese Patent Application Laid-Open Specification No. 2002-3596, 2,6-xylenol was subjected to an oxidative coupling polymerization in the presence of dibutylamine, and the resultant reaction product was dried, thereby obtaining a white powdery polyphenylene ether. The obtained white powdery polyphenylene ether was then subjected to drying using a hot air dryer at 120° C. so that the amount of a volatile substance contained in the polyphenylene ether became 0.1% by weight in terms of a weight decrease (% by weight) of the polyphenylene ether as measured by subjecting the polyphenylene ether to vacuum drying under a vacuum of $1.3 \times 10^3$ Pa at 180° C. for 1 hour. The weight decrease was calculated by the following formula:

weight decrease (% by weight) ={(weight of polyphenylene ether prior to vacuum drying −weight of polyphenylene ether after vacuum drying) /weight of polyphenylene ether prior to vacuum drying}×100.

Also in the case of the below-mentioned PPE-2 to PPE-4 and M-PPE, the same calculation as described above was performed.

The thus obtained powdery polyphenylene ether (PPE-1) exhibited a reduced viscosity of 0.52 dl/g (measured at 30° C. using a 0.5 g/dl chloroform solution of PPE-1).

(2-2) Polyphenylene Ether (Hereinafter Abbreviated to "PPE-2")

In accordance with Unexamined Japanese Patent Application Laid-Open Specification No. Sho 64-33131, 2,6-xylenol was subjected to an oxidative coupling polymerization in the presence of dibutylamine, and the resultant reaction product was dried, thereby obtaining a white powdery polyphenylene ether. The obtained white powdery polyphenylene ether was then subjected to drying using a hot air dryer at 120° C. so that the amount of a volatile substance contained in the polyphenylene ether became 1.3% by weight in terms of a weight decrease (% by weight) of the polyphenylene ether as measured by subjecting the polyphenylene ether to vacuum drying under a vacuum of $1.3 \times 10^3$ Pa at 180° C. for 1 hour. The thus obtained powdery polyphenylene ether (PPE-2) exhibited a reduced viscosity of 0.54 dl/g (measured at 30° C. using a 0.5 g/dl chloroform solution of PPE-2).

(2-3) Polyphenylene Ether (Hereinafter Abbreviated to "PPE-3")

In accordance with Unexamined Japanese Patent Application Laid-Open Specification No. 2002-3596, 2,6-xylenol was subjected to an oxidative coupling polymerization in the presence of dibutylamine, and the resultant reaction product was dried, thereby obtaining a white powdery polyphenylene ether. The obtained white powdery polyphenylene ether was then subjected to drying using a hot air dryer at 120° C. so that the amount of a volatile substance contained in the polyphenylene ether became 0.9% by weight in terms of a weight decrease (% by weight) of the polyphenylene ether as measured by subjecting the polyphenylene ether to vacuum drying under a vacuum of $1.3 \times 10^3$ Pa at 180° C. for 1 hour. The thus obtained powdery polyphenylene ether (PPE-3) exhibited a reduced viscosity of 0.50 dl/g (measured at 30° C. using a 0.5 g/dl chloroform solution of PPE-3).

(2-4) Polyphenylene Ether (Hereinafter Abbreviated to "PPE-4")

In accordance with Unexamined Japanese Patent Application Laid-Open Specification No. Sho 64-33131, 2,6-xylenol was subjected to an oxidative coupling polymerization in the presence of dibutylamine, and the resultant reaction product was dried, thereby obtaining a white powdery polyphenylene ether. The obtained white powdery polyphenylene ether was then subjected to drying using a hot air dryer at 120° C. so that the amount of a volatile substance contained in the polyphenylene ether became 2.2% by weight in terms of a weight decrease (% by weight) of the polyphenylene ether as measured by subjecting the polyphenylene ether to vacuum drying under a vacuum of $1.3 \times 10^3$ Pa at 180° C. for 1 hour. The thus obtained powdery polyphenylene ether (PPE-4) exhibited a reduced viscosity of 0.42 dl/g (measured at 30° C. using a 0.5 g/dl chloroform solution of PPE-4).

(2-5) Polyphenylene Ether Modified with Maleic Anhydride (Hereinafter Abbreviated to "M-PPE")

M-PPE was prepared by a method in which 0.1 part by weight of di-tert-butylperoxide (as a radical initiator) and 1.5 parts by weight of maleic anhydride were added to 100 parts by weight of PPE-4, followed by melt-kneading of the resultant mixture in a twin-screw extruder at a cylinder temperature of 320° C.

The amount of the maleic anhydride incorporated into the modified polyphenylene ether was 0.5% by weight, based on the weight of the modified polyphenylene ether.

The amount of the unreacted maleic anhydride in the modified polyphenylene ether was 0.008% by weight, based on the weight of the modified polyphenylene ether.

The amount of a volatile substance in the modified polyphenylene ether was 0.3% by weight, based on the weight of the modified polyphenylene ether.

(3) Conductive Carbonaceous Materials (D) (i.e., Conductive Carbon Black and Conductive Carbon Fibril)

(3-1) Conductive Carbon Black (Hereinafter Abbreviated to "CB")

Trade name: Ketjenblack EC-600JD (manufactured and sold by Ketjenblack International Corporation, Japan)

A masterbatch was produced using the above-mentioned CB, as follows. There was provided a twin-screw extruder having at least one inlet at an upstream portion thereof (hereinafter referred to as "upstream inlet") and at least one inlet at a downstream portion thereof (hereinafter referred to as "downstream inlet"). The twin-screw extruder was operated at a cylinder temperature of 270° C. 90 Parts by weight of the polyamide 6,6 were fed to the extruder from the upstream inlet, and then 10 parts by weight of the CB were fed to the extruder from the downstream-side inlet, thereby melt-kneading the polyamide 6,6 with the CB, to obtain a masterbatch (hereinafter referred to as "PA66/CB-MB"). A cross-section of a sample of the obtained masterbatch PA66/CB-MB was obtained, and observed with respect to a contiguous area of 3 mm$^2$ therein by using a reflection optical microscope (model PME3, manufactured and sold by Olympus Corporation, Japan) at a magnification of 50, and the number of agglomerated particles of conductive carbon black each independently having a major axis of 20 to 100 μm was visually counted. It was found that 19 agglomerated particles of conductive carbon black each independently having a major axis of 20 to 100 μm were present in the contiguous area of 3 mm$^2$.

(3-2) Conductive Carbon Fibril (Hereinafter Abbreviated to "CNT")

Hyperion masterbatch (manufactured and sold by Hyperion Catalysis International, U.S.A.): a nylon 6,6/carbon fibril masterbatch containing carbon fibrils having an average fiber diameter of about 10 to 15 μm (carbon fibril content: 20% by weight) (hereinafter abbreviated to "PA66/CNT-MB").

(4) Rubbery Polymer (C)

(4-1) Polystyrene/Hydrogenated Polybutadiene/Polystyrene block Copolymer (Hereinafter Abbreviated to "SEBS-1")

Number average molecular weight=246,000
Total styrene content (styrene block content) =33% by weight (4-2) Polystyrene/Hydrogenated Polybutadiene/Polystyrene Block Copolymer (Hereinafter Abbreviated to "SEBS-2")

Number average molecular weight=77,000
Total styrene content (styrene block content) =67% by weight (5) Low molecular weight modifier compound (E) (compatibility agent): maleic anhydride (manufactured and sold by Mitsubishi Chemical Corporation, Japan) (hereinafter abbreviated to "MAH")

(6) Inorganic Filler (6-1) Wollastonite (Manufactured and Sold by Nyco Minerals Inc., Canada)

There was provided a wollastonite having an average particle diameter of 4 μm and an average fiber length of 32 μm (aspect ratio: 8) and exhibiting a heating weight loss of 0.7% by weight as measured at 1,000° C. The wollastonite was treated with an aqueous 0.5% aminosilane solution.

(Measuring Methods)

The methods for measuring conductivity (volume resistivity), Izod impact strength, heat stability during the residence in a molding machine, amount of die build-up, and coating adhesion strength are explained below.

(1) The Amount of Die Build-Up

An extruder was operated for 1 hour, and the number of die build-ups having a size of 5 mm or more which occurred during the operation of the extruder was counted.

(2) Volume Resistivity

Pellets of a resin composition were molded into a dumbbell-shaped bar described under ISO 294 by using a molding machine (IS-80EPN molding machine, manufactured and sold by TOSHIBA MACHINE CO., LTD., Japan) under conditions wherein the cylinder temperature was 280° C. and the mold temperature was 80° C. Both end portions of the dumbbell-shaped bar were broken off so as to obtain a test specimen having a uniform cross-sectional area of 10 mm×4 mm and a length of about 70 mm and having a broken-exposed surface at both ends. The breaking off of the end portions of the dumbbell-shaped bar was performed by a method in which the dumbbell-shaped bar is first nicked at two end portions with a cutter, and the resultant nicked dumbbell-shaped bar (having a nick at both end portions) was immersed in a dry ice/methanol mixture having a temperature of −75 to −70° C. for 1 hour, whereupon the resultant cooled, brittle dumbbell-shaped bar is broken at the two nicked end portions, thereby obtaining a test specimen. The volume resistivity of the test specimen was measured by a method in which a silver-containing coating composition is applied to the broken-exposed both end surfaces of the obtained test specimen, and a voltage of 250 V is applied across the resultant silver-coated both end surfaces of the test specimen while measuring the volume resistivity by using an electrometer (R8340A, manufactured and sold by ADVANTEST CORPORATION, Japan). The measurement was performed with respect to five different test specimens (each prepared in the same manner as mentioned above), and the average value of the five measured values was used as the volume resistivity.

(3) Izod Impact Strength

Pellets of a resin composition were molded by using a molding machine (IS-80EPN molding machine, manufactured and sold by TOSHIBA MACHINE CO., LTD., Japan) under conditions wherein the cylinder temperature was 280° C. and the mold temperature was 80° C., to thereby obtain a test strip having a thickness of 3.2 mm. The notched Izod impact strength of the 3.2 mm-thick test strip was measured in accordance with ASTM D256.

(4) Heat Stability During the Residence in a Molding Machine

Pellets of a resin composition were molded by using a molding machine [FE120 molding machine (equipped with a shut-off nozzle), manufactured and sold by NISSEI PLASTIC INDUSTRIAL CO., LTD., Japan], to thereby obtain a flat plate having a size of 120 mm×80 mm (thickness: 3 mm)). The molding was performed under conditions wherein the cylinder temperature was 310° C., "injection time+holding time" was 15 seconds (wherein the injection time was 0.7 second or 3 seconds), the cooling time was 12 to 70 seconds, and the interval time (i.e., "time for opening the mold+time for taking out the obtained shaped article from the mold") was 5 seconds. The residence time was calculated by the following formula: (injection time+holding time+cooling time+interval time)×(maximum resin amount which can be molded by the molding machine/actual resin amount of 1 shot). The appearance (degree of the occurrence of silver streaks) of the flat plate molded was visually observed. The minimum residence time (critical residence time) necessary for causing a molded flat plate to have a small amount of silver streaks was measured. Based on the critical residence time, the heat stability during the residence in a molding machine was evaluated.

(5) Test of The Coating Adhesion Strength

Pellets of a resin composition were molded by using a molding machine (FS80S molding machine, manufactured and sold by NISSEI PLASTIC INDUSTRIAL CO., LTD., Japan) under conditions wherein the cylinder temperature was 305° C., the mold temperature was 80° C., and the mold filling time was 1 second, to thereby obtain a flat plate having a size of 10 cm×10 cm (thickness: 2 mm). The measurement of the coating adhesion strength was performed with respect to each of the thus prepared flat plate and a heat-treated flat plate obtained by heating the thus prepared flat plate at 204° C. for 40 minutes. For evaluation of the strength of adhesion of a coating to a shaped article, the flat plate was coated by using an automated spray coating machine under conditions wherein the resultant coating had a thickness of 20 μm. As a coating composition, an acrylic urethane coating (OP-Z-NY, manufactured and sold by Origin Electric Co., Ltd., Japan) was used. After completion of the spray coating, the coated flat plate was baked at 150° C. for 20 minutes.

Then, the coated flat plate was allowed to stand still at 23° C. and at a humidity of 50% for 24 hours. An area having a size of 2 cm×2 cm was chosen in the coated surface of the flat plate, and the coated surface of this area was cut with a cutter to form a checkered cut pattern composed of 100 square coating sections each having a size of 2 mm×2 mm, whereupon a peeling test was performed in which a cellophane adhesive tape was adhered to the coated surface portion having the checkered cut pattern and, then, quickly peeled off. The coating adhesion strength was evaluated by measuring the number of square coating sections which were left on the coated surface after the cellophane adhesive tape had been peeled off.

Measurement of the weight average molecular weight (Mw) and number average molecular weight (Mn) of PPE A flat plate having a size of 10 cm×10 cm (thickness: 2 mm) was prepared in the same manner as in the production of the flat plate used in the above-mentioned test of the coating adhesion strength. The flat plate was pulverized into polymer particles having a diameter of about 0.5 mm, and the obtained polymer particles were subjected to Soxhlet extraction using 50 ml of chloroform. The resultant solution of the polymer in chloroform (in which the main solutes are the polyphenylene ether and the block copolymers) was analyzed by GPC (gel permeation chromatography) using an ultraviolet spectrometric detector, and the weight average molecular weight (Mw) of polyphenylene ether was determined using a calibration curve obtained with respect to standard polystyrene samples. The ultraviolet spectrometric detector was operated at a UV wavelength of 283 nm so as not to detect the block copolymers which are eluted concomitantly with the polyphenylene ether during the GPC analysis.

Measurement of chloroform-soluble component present in the surface portion of a shaped article which is after being heated at 204° C. for 40 minutes A flat plate having a size of 10 cm×10 cm (thickness: 2 mm) was prepared in the same manner as in the production of the flat plate used in the above-mentioned test of the coating adhesion strength. The flat plate was subjected to heat treatment at 204° C. for 40 minutes, and then cut into a size of about 8 cm×8 cm (thickness: 2 mm). The obtained flat plate of about 8 cm×8 cm was immersed, for about 1 hour, in 50 ml of chloroform (manufactured and sold by Wako Pure Chemical Industries, Ltd., Japan; reagent grade) placed in a Petri dish having a diameter of about 12.5 cm. Subsequently, the flat plate was taken out from the chloroform, and 40 ml of the chloroform (containing an extract) was taken out and subjected to evaporation and drying, thereby obtain a dry solid product.

To the obtained dry solid product was added 2 ml of tetrahydrofuran (manufactured and sold by Wako Pure Chemical Industries, Ltd., Japan; product for use in HPLC), to thereby obtain a sample solution. The obtained sample solution was analyzed by size exclusion chromatography using a differential refractometer, and there was calculated a ratio of the height of a peak or the total heights of peaks which is or are observed at an elution time within the range of from 22 to 23.5 minutes, relative to the height of a peak or the total height of peaks which is or are observed at an elution time within the range of from 14 to 15 minutes, each peak observed in the size exclusion chromatography.

The apparatuses used for the size exclusion chromatography were as follows:

On-line degassifier (DE): ERC-3322 (manufactured and sold by ERC Inc., Japan)

Liquid transfer pump (PO): DP-8020 (manufactured and sold by Tosoh Corporation, Japan)

Column oven (CO): CO-8010 (manufactured and sold by Tosoh Corporation, Japan)

UV-visible light absorption spectrophotometer (UV): UV-8010 (manufactured and sold by Tosoh Corporation, Japan)

Differential refractometer (RI): RI-8012 (manufactured and sold by Tosoh Corporation, Japan)

The above-mentioned apparatuses were connected as shown in FIG. 1. The solvent was tetrahydrofuran (manufactured and sold by Wako Pure Chemical Industries, Ltd., Japan; product for use in HPLC). The analysis conditions were as follows: the flow rate was 1 ml/minute; the oven temperature was 40° C.; and the UV detection wavelength was 254 nm. In the column oven, there were provided the below-mentioned columns (all of which are manufactured and sold by Tosoh Corporation, Japan) for size exclusion chromatography:

Guard column: TSKguardcolumn $H_{XL}$-L
Column 1 and column 2: TSKgel $G100H_{XL}$
Column 3: TSKgel $G2000H_{XL}$.

The guard column, column 1, column 2 and column 3 were connected in series in this order, and the sample solution was flowed through these columns from the side of the guard column to the side of column 3.

As a standard sample, Irganox 1076 (manufactured and sold by Ciba Specialty Chemicals, Switzerland) was analyzed by the differential refractometer used in the size exclusion chromatography. It was found that the elution time of Irganox 1076 was 17.8 minutes.

EXAMPLES 1 to 6, 8 and 9, AND COMPARATIVE EXAMPLES 1 to 6

A conductive resin composition in the form of pellets was produced using a twin-screw extruder (ZSK -58MC, manufactured and sold by Coperion Werner & Pfleiderer GmbH & Co. KG, Germany) which had one inlet at an upstream portion thereof (hereinafter, referred to as "upstream inlet") and another inlet at a downstream portion thereof (hereinafter, referred to as "downstream inlet"). Specifically, polyphenylene ether (B), rubbery polymer (C) and modifier compound (E) (compatibility agent) were fed into the twin-screw extruder through the upstream inlet of the extruder, thereby melt-kneading the resultant mixture, while feeding a masterbatch (PA66/CB-MB or PA66/CNT-MB) containing polyamide 6,6 (A) and conductive carbonaceous material (D) (a conductive carbon black or a conductive carbon fibril) into the twin-screw extruder through the downstream inlet, thereby obtaining a conductive resin composition in the form of pellets. The cylinder temperature of the twin-screw extrude was 300° C. During the melt kneading by the twin-screw extruder, the amount of die build-up was measured. Further, the obtained pellets were molded, and the properties (i.e., heat stability during the residence of the pellets in a molding machine, volume resistivity, Izod impact strength, and coating adhesion strength) of the conductive resin composition were evaluated by the above-mentioned methods. Further, by the above-mentioned methods using a resin composition in the form of a flat plate, the weight average molecular weight (Mw) and number average molecular weight (Mn) of PPE were measured, and a chloro-form-soluble component present in the surface portion of a shaped article which was after being heated at 204° C. for 40 minutes was analyzed. The formulations and properties are shown in Table 1 with respect to each of compositions containing 1.9% by weight of the conductive carbon black and a composition containing 2.0% by weight of a conductive carbon fibril. Further, the formulation and properties of a composition containing 2.5% by weight of a conductive carbon black are shown in Table 2.

TABLE 1

| | Resin components | Unit | Ex. 1 | Ex. 2 | Ex. 3 | Ex. 4 | Ex. 5 | Ex. 6 |
|---|---|---|---|---|---|---|---|---|
| Upstream inlet | PPE-1 | Part by weight | 34 | 34 | 34 | | | |
| | PPE-2 | | | | | | 20 | 20 |
| | PPE-3 | | | | | 34 | | |
| | PPE-4 | | | | | | | |
| | M-PPE | | | | | | 14 | 14 |
| | MAH | | 0.18 | 0.1 | 0.05 | 0.1 | 0.03 | 0.03 |
| | SEBS-1 | | 8.5 | 8.5 | 8.5 | 8.5 | 8.5 | 8.5 |
| | SEBS-2 | | 2.5 | 2.5 | 2.5 | 2.5 | 2.5 | 2.5 |
| Downstream inlet (1) | PA66 | | 36 | 36 | 36 | 36 | 36 | 45 |
| | PA66/CB-MB | | 19 | 19 | 19 | 19 | 19 | |
| | PA66/CNT-MB | | | | | | | 10 |
| Downstream inlet (2) | Wollastonite | | | | | | | |
| Amount of conductive carbonaceous material (based on the total weight of (A) to (E)) | | wt % | 1.90 | 1.90 | 1.90 | 1.90 | 1.90 | 2.00 |
| Amount of MAH (based on the total weight of (A) to (E)) | | wt % | 0.180 | 0.100 | 0.050 | 0.100 | 0.030 | 0.030 |
| Amount of volatile substance in PPE (based on the weight of (B)) | | wt % | 0.1 | 0.1 | 0.1 | 0.9 | 0.9 | 0.9 |
| $-7.3 \times E + 1.83$ | | wt % | 0.5 | 1.1 | 1.5 | 1.1 | 1.6 | 1.6 |
| Mw of PPE | | | 56000 | 58000 | 58000 | 65000 | 64000 | 64000 |
| Mw/Mn of PPE | | | 3.0 | 2.8 | 2.9 | 3.5 | 2.8 | 2.8 |
| Amount of chloroform-soluble component (peak height ratio) | | | 0.1 | 0.06 | 0.03 | 0.14 | 0.01 | 0.01 |
| Volume resistivity | | $\Omega \cdot cm$ | $2.4 \times 10^5$ | $1.0 \times 10^5$ | $8.0 \times 10^4$ | $2.4 \times 10^5$ | $8.0 \times 10^4$ | $1.7 \times 10^4$ |
| Izod impact strength | | J/m | 190 | 180 | 180 | 190 | 210 | 230 |
| Residence time (310° C./0.7 sec(injection time)) | | sec | 420 | 490 | 560 | 560 | 560 | 560 |
| Residence time (310° C./3 sec(injection time)) | | sec | 350 | 420 | 490 | 490 | 490 | 490 |
| Amount of die build-up | | Number | 0 | 0 | 0 | 0 | 0 | 0 |
| Coating adhesion strength (after molding) | | | 100/100 | 100/100 | 100/100 | 100/100 | 100/100 | 100/100 |
| Coating adhesion strength (after exposure to heat) | | | 90/100 | 96/100 | 97/100 | 93/100 | 99/100 | 100/100 |

| | Resin components | Unit | Ex. 7 | Comp. Ex. 1 | Comp. Ex. 2 | Comp. Ex. 3 | Comp. Ex. 4 |
|---|---|---|---|---|---|---|---|
| Upstream inlet | PPE-1 | Part by weight | 34 | 34 | | | |
| | PPE-2 | | | | 34 | | |
| | PPE-3 | | | | | 34 | |
| | PPE-4 | | | | | | 20 |
| | M-PPE | | | | | | 14 |
| | MAH | | | 0.1 | 0.25 | 0.18 | 0.2 | 0.002 |

TABLE 1-continued

|  |  |  |  |  |  |  |  |
|---|---|---|---|---|---|---|---|
|  | SEBS-1 |  | 8.5 | 8.5 | 8.5 | 8.5 | 8.5 |
|  | SEBS-2 |  | 2.5 | 2.5 | 2.5 | 2.5 | 2.5 |
| Downstream inlet (1) | PA66 |  | 36 | 36 | 36 | 36 | 36 |
|  | PA66/CB-MB |  | 19 | 19 | 19 | 19 | 19 |
|  | PA66/CNT-MB |  |  |  |  |  |  |
| Downstream inlet (2) | Wollastonite |  | 20 |  |  |  |  |
| Amount of conductive carbonaceous material (based on the total weight of (A) to (E)) |  | wt % | 1.90 | 1.90 | 1.90 | 1.90 | 1.90 |
| Amount of MAH (based on the total weight of (A) to (E)) |  | wt % | 0.100 | 0.249 | 0.180 | 0.200 | 0.002 |
| Amount of volatile substance in PPE (based on the weight of (B)) |  | wt % | 0.1 | 0.1 | 1.3 | 0.9 | 1.4 |
| −7.3 × E + 1.83 |  | wt % | 1.1 | 0.0 | 0.5 | 0.4 | 1.8 |
| Mw of PPE |  |  | 56000 | 53000 | 73000 | 65000 | 48000 |
| Mw/Mn of PPE |  |  | 2.9 | 3.1 | 2.8 | 3.5 | 2.7 |
| Amount of chloroform-soluble component (peak height ratio) |  |  | 0.07 | 0.18 | 0.25 | 0.18 | 0.35 |
| Volume resistivity |  | Ω · cm | $9.0 \times 10^3$ | $1.1 \times 10^5$ | $1.9 \times 10^5$ | $1.4 \times 10^5$ | $1.0 \times 10^6$ |
| Izod impact strength |  | J/m | 120 | 200 | 190 | 200 | 140 |
| Residence time (310° C./0.7 sec(injection time)) |  | sec | 560 | 280 | 224 | 224 | 350 |
| Residence time (310° C./3 sec(injection time)) |  | sec | 490 | <224 | <224 | <224 | 280 |
| Amount of die build-up |  | Number | 0 | 12 | 10 | 13 | 0 |
| Coating adhesion strength (after molding) |  |  | 100/100 | 100/100 | 100/100 | 100/100 | 78/100 |
| Coating adhesion strength (after exposure to heat) |  |  | 99/100 | 79/100 | 67/100 | 71/100 | 45/100 |

TABLE 2

|  | Resin components | Unit | Ex. 8 | Ex. 9 | Comp. Ex. 5 | Comp. Ex. 6 |
|---|---|---|---|---|---|---|
| Upstream inlet | PPE-1 | Part by weight | 20 |  | 20 |  |
|  | PPE-2 |  | 14 |  | 14 | 34 |
|  | PPE-3 |  |  | 34 |  |  |
|  | MAH |  | 0.15 | 0.1 | 0.25 | 0.15 |
|  | SEBS-1 |  | 8.5 | 8.5 | 8.5 | 8.5 |
|  | SEBS-2 |  | 2.5 | 2.5 | 2.5 | 2.5 |
| Downstream inlet (1) | PA66 |  | 30 | 30 | 30 | 30 |
|  | PA66/CB-MB |  | 25 | 25 | 25 | 25 |
| Amount of conductive carbonaceous material (based on the total weight of (A) to (E)) |  | wt % | 2.50 | 2.50 | 2.49 | 2.50 |
| Amount of MAH (based on the total weight of (A) to (E)) |  | wt % | 0.150 | 0.100 | 0.249 | 0.150 |
| Amount of volatile substance in PPE (based on the weight of (B)) |  | wt % | 0.6 | 0.9 | 0.6 | 1.3 |
| −7.3 × E + 1.83 |  | wt % | 0.7 | 1.1 | 0.0 | 0.7 |
| Volume resistivity |  | Ω · cm | $2 \times 10^4$ | $1 \times 10^4$ | $1.1 \times 10^5$ | $9 \times 10^4$ |
| Izod impact strength |  | J/m | 150 | 140 | 150 | 150 |
| Residence time (310° C./0.7 sec(injection time)) |  | sec | 420 | 420 | <224 | <224 |
| Residence time (310° C./3 sec(injection time)) |  | sec | 350 | 350 | <224 | <224 |
| Amount of die build-up |  | Number | 0 | 0 | 12 | 15 |
| Coating adhesion strength (after molding) |  |  | 100/100 | 100/100 | 100/100 | 100/100 |
| Coating adhesion strength (after exposure to heat) |  |  | 99/100 | 99/100 | 61/100 | 59/100 |

Figure 2B:
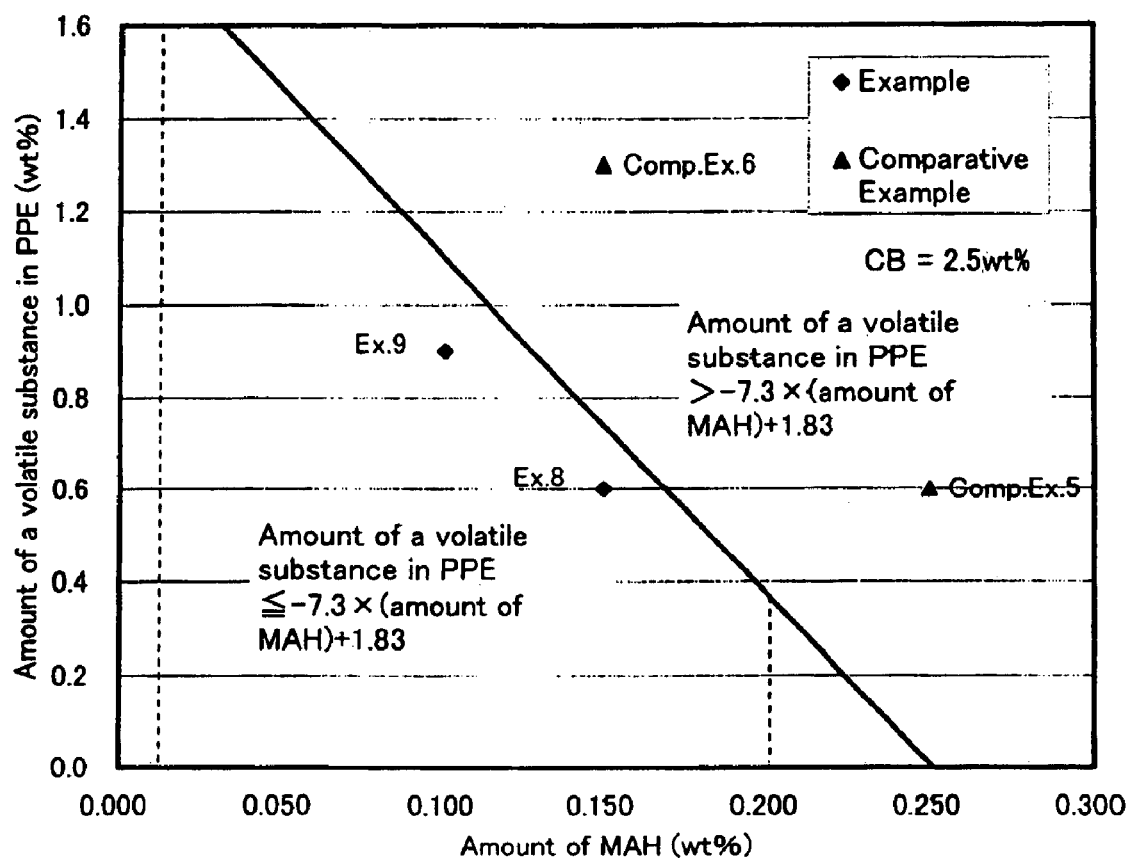

As can be seen from Table 1 above, when the amounts of the component (D) and the modifier compound (E) (compatibility agent) are in the range of from 0.2 to 3% by weight and in the range of from more than 0.01% by weight to less than 0.20% by weight, respectively, each based on the total weight of the components (A) to (E), and the amount (a) of a volatile substance contained in the component (B) (PPE) satisfies the following formula: $0 \leq a \leq -7.3 \times E + 1.83$, not only is the heat stability of the resin composition during the residence thereof in an extruder and a molding machine greatly improved, but also a shaped article obtained from the resin composition has markedly improved coating adhesion strength even after exposure of the shaped article to heat. FIG. 2(a) is a diagram showing the relationship between the amount of a volatile substance contained in the polyphenylene ether and the amount of the compatibility agent (i.e., second low molecular weight modifier compound), the relationship being found in the Examples and Comparative Examples employing the conductive carbonaceous material (D) (a carbon black or a carbon fibril) in an amount of 1.9% by weight. FIG. 2(a) clearly shows whether or not the compositions of the Examples and the Comparative Examples satisfy the requirements of the present invention. The same applies to the compositions shown in Table 2 above and FIG. 2(b), each containing the component (D) (a carbon black or a carbon fibril) in an amount of 2.5% by weight.

Further, with respect to each of the conductive carbon black-containing shaped resin articles obtained in Examples 1 to 5, the proportion of secondary agglomerated particles each having an area of 8 mm² or more, which are present in the resin composition, was measured by observation with a magnification of ×100 under a reflection optical microscope with respect to the surface portions of the shaped resin article, which surface portions have a total area of 10 mm². As a result, it was found that the proportion of secondary agglomerated particles each having an area of 8 mm² or more was in the range of from 54 to 69% by weight.

EXAMPLE 7

A conductive resin composition in the form of pellets was produced in substantially the same manner as in Example 1 except that the twin-screw extruder (ZSK-58MC, manufactured and sold by Coperion Werner & Pfleiderer GmbH & Co. KG, Germany) had one upstream inlet and two downstream inlets (1) and (2), and that polyphenylene ether (B), rubbery polymer (C) and modifier compound (E) (compatibility agent) were fed into the twin-screw extruder through the upstream inlet of the extruder, thereby melt-kneading the resultant mixture, while feeding a masterbatch (PA/CB-MB) containing polyamide 6,6 (A) and conductive carbonaceous material (D) (conductive carbon black) into the extruder through the downstream inlet (1) (positioned between the upstream inlet and the downstream inlet (2)) and feeding wollastonite into the extruder through the downstream inlet (2), thereby obtaining pellets of a resin composition containing polyamide 6,6 (component (A)), polyphenylene ether (B), rubbery polymer (C), conductive carbonaceous material (D), modifier compound (E) and wollastonite. The formulation and properties of the obtained resin composition are shown in Table 1 above.

In this Example, it has been confirmed that, also in the case where the wollastonite is added to the resin composition of the present invention, not only is the heat stability of the resin composition during the residence thereof in an extruder and a molding machine greatly improved, but also a shaped article obtained from the resin composition has a markedly improved coating adhesion strength even after exposure of the shaped article to heat. Further, it has been confirmed that the addition of an inorganic filler markedly lowers the volume resistivity of the resin composition, thereby improving the conductivity of the resin composition.

INDUSTRIAL APPLICABILITY

In the resin composition of the present invention, by using a conductive carbon black and/or a conductive carbon fibril in a specific amount and reducing the amount of a volatile substance contained in polyphenylene ether to a specific amount, the resin composition not only exhibits excellent impact strength and heat stability, but also is capable of suppressing die build-up and strand breakage which occur during the extrusion molding thereof. Such a conductive resin composition can be used in a wide variety of fields, such as electric and electronic parts, parts of office automation machines, automobile parts and other mechanical parts. Especially, even when used as a material for producing a large shaped article, the resin composition exhibits excellent heat stability during the residence thereof in a molding machine, and the resultant shaped article has not only conductivity sufficient for electrostatic coating but also excellent coating adhesion strength even after exposure of the shaped article to heat. Therefore, the conductive resin composition of the present invention is very advantageous as a material for producing a large shaped article, such as an automobile outer panel, which is subjected to an electrostatic coating.

The invention claimed is:

1. A conductive resin composition produced by melt-kneading a mixture comprising:
    a polyamide (A),
    at least one polyphenylene ether (B) selected from the group consisting of a non-terminal-modified polyphenylene ether and a terminal-modified polyphenylene ether, wherein said terminal-modified polyphenylene ether is obtained by melt-kneading a non-terminal-modified polyphenylene ether with a first low molecular weight modifier compound (b) which functions as a compatibility agent for said polyamide (A) and said polyphenylene ether (B),
    a rubbery polymer (C),
    at least one conductive carbonaceous material (D) selected from the group consisting of a conductive carbon black and a conductive carbon fibril, and
    a second low molecular weight modifier compound (E) which functions as a compatibility agent for said polyamide (A) and said polyphenylene ether (B),
    wherein said first low molecular weight modifier compound (b) and said second low molecular weight modifier compound (E) are the same or different,
    wherein said mixture has the following characteristics:
    (1) the amount of said at least one conductive carbonaceous material (D) is in the range of from 0.2 to 3% by weight, based on the total weight of said components (A) to (E),
    (2) the amount of said second low molecular weight modifier compound (E) is in the range of from more than 0.01% by weight to less than 0.20% by weight, based on the total weight of said components (A) to (E), and
    (3) the amount (a) of a volatile substance contained in said at least one polyphenylene ether (B) satisfies the following formula:

$$0 \leq a \leq -7.3 \times E + 1.83,$$

wherein E represents the % by weight of said component (E), based on the total weight of said components (A) to (E),
    said amount (a) being expressed in terms of a weight decrease (% by weight) of said at least one polyphenylene ether (B) as measured by subjecting said at least one polyphenylene ether (B) to vacuum drying under a vacuum of $1.3 \times 10^2$ to $6.7 \times 10^3$ Pa at 180° C. for 1 hour, wherein the weight decrease is calculated by the following formula:

weight decrease (% by weight) = {(weight of polyphenylene ether (B) prior to vacuum drying−weight of polyphenylene ether (B) after vacuum drying)/ weight of polyphenylene ether (B) prior to vacuum drying}×100.

2. The resin composition according to claim 1, wherein the amount of said second low molecular weight modifier compound (E) in said mixture is in the range of from 0.02 to 0.18% by weight, based on the total weight of said components (A) to (E).

3. The resin composition according to claim 1, wherein the amount of said second low molecular weight modifier compound (E) in said mixture is in the range of from 0.02 to 0.15% by weight, based on the total weight of said components (A) to (E).

4. The resin composition according to claim 1, wherein the amount of said at least one carbonaceous material (D) in said mixture is in the range of from 0.5 to 2.5% by weight, based on the total weight of said components (A) to(E).

5. The resin composition according to claim 1, wherein said amount (a) of said volatile substance is 1.0% by weight or less.

6. The resin composition according to claim 1, wherein said component (D) is a conductive carbon black.

7. The resin composition according to claim 1, wherein said conductive carbon black as component (D) exhibits a dibutyl phthalate (DBP) oil absorption value of at least 250 ml per 100 g of the carbon black.

8. The resin composition according to claim 1, wherein each of said first low molecular weight modifier compound (b) and said second low molecular weight modifier compound (E) is independently at least one compound selected from the group consisting of maleic anhyd ride, fumaric acid, maleic acid, itaconic acid, itaconic anhydride, citraconic acid, citraconic anhydride, aconitic acid, aconitic anhydride, citric acid and malic acid.

9. The resin composition according to claim 1, wherein said rubbery polymer (C) is a mixture of at least one relatively low molecular weight block copolymer (C-1) having a number average molecular weight of 120,000 or less and at least one relatively high molecular weight block copolymer (C-2) having a number average molecular weight of 200,000 or more, each of said block copolymers (C-1) and (C-2) independently comprising at least one vinyl aromatic hydrocarbon polymer block comprised mainly of vinyl aromatic hydrocarbon monomer units, and at least one conjugated diene polymer block comprised mainly of conjugated diene monomer units.

10. The resin composition according to claim 9, wherein said at least one relatively low molecular weight block copolymer (C-1) comprises:
   10 to 100 parts by weight of a block copolymer (C-1a) having a content of said at least one vinyl aromatic hydrocarbon polymer block within the range of from 55 to 90% by weight, based on the weight of the block copolymer (C-1a), and
   0 to 90 parts by weight of a block copolymer (C-1b) having a content of said at least one vinyl aromatic hydrocarbon polymer block of less than 55% by weight, based on the weight of the block copolymer (C-1b),
   wherein the total of said block copolymers (C-1a) and (C-1b) is 100 parts by weight.

11. The resin composition according to claim 1, wherein the weight average molecular weight of said at least one polyphenylene ether (B) in said resin composition is 50,000 or more, and the molecular weight distribution of said at least one polyphenylene ether (B) in said resin composition is 3.2 or less in terms of the Mw/Mn ratio, wherein Mw represents the weight average molecular weight of said component (B) and Mn represents the number average molecular weight of said component (B).

12. The resin composition according to claim 11, wherein the weight average molecular weight of said at least one polyphenylene ether (B) in said resin composition is in the range of from 55,000 to 70,000, and the molecular weight distribution of said at least one polyphenylene ether (B) in said resin composition is 3.0 or less in terms of the Mw/Mn ratio.

13. The resin composition according to claim 1, wherein the melt-kneading of a mixture of said components (A) to (E) is performed by a method comprising:
   (1) melt-kneading together at least a part of said polyamide (A) and said at least one conductive carbonaceous material (D) to thereby obtain a masterbatch, and (2) melt-kneading the obtained masterbatch with said components (B), (C) and (E), and the remaining part, if any, of said polyamide (A).

14. The resin composition according to claim 13, wherein said masterbatch comprises a conductive carbon black as said component (D), wherein at least a part of said conductive carbon black is present in the form of 1 to 100 agglomerated particles each independently having a major axis of 20 to 100 µm, as observed under an optical microscope with respect to a contiguous area of 3 $mm^2$.

15. The resin composition according to claim 1, wherein said mixture further comprises at least one inorganic filler in an amount of 5 to 25 parts by weight, relative to 100 parts by weight of the total of said components (A) to (E).

16. The resin composition according to claim 1, wherein said polyphenylene ether (B) is a mixture of the non-terminal-modified polyphenylene ether and the terminal-modified polyphenylene ether.

17. The resin composition of any one of claims 1 to 15, which is a shaped article.

18. The resin composition of claim 17, which contains at least one low molecular weight component which is detected in size exclusion chromatography at an elution time within the range of from 22 to 23.5 minutes, said size exclusion chromatography being performed using tetrahydrofuran as an eluent with respect to a chloroform-soluble component present in the surface portion of said shaped article which is after being heated at 204° C. for 40 minutes, and
   wherein the amount of said at least one low molecular weight component is 0.15 or less in terms of a ratio of the height of a peak or the total heights of peaks which is or are observed at an elution time within the range of from 22 to 23.5 minutes, relative to the height of a peak or the total height of peaks which is or are observed at an elution time within the range of from 14 to 15 minutes, each peak observed in said size exclusion chromatography.

19. The resin composition according to claim 18, wherein the amount of said at least one low molecular weight component is up to 0.10.

20. The resin composition according to claim 17, which is an online-coated automobile fender.

* * * * *